(12) United States Patent
Ikeda

(10) Patent No.: US 6,605,983 B2
(45) Date of Patent: Aug. 12, 2003

(54) VOLTAGE CONVERSION CIRCUIT

(75) Inventor: Masuhide Ikeda, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/010,197

(22) Filed: Nov. 30, 2001

(65) Prior Publication Data

US 2002/0089369 A1 Jul. 11, 2002

(30) Foreign Application Priority Data

Jan. 10, 2001 (JP) ........................... 2001-003028

(51) Int. Cl.[7] ................................................. G05F 1/10
(52) U.S. Cl. ..................... 327/536; 327/537; 363/59
(58) Field of Search .............................. 257/369, 371; 327/536, 537, 534, 535, 227; 363/60, 59

(56) References Cited

U.S. PATENT DOCUMENTS 4,777,577 A * 10/1988 Bingham et al. ............. 363/60
4,999,761 A * 3/1991 Bingham et al. ............. 363/60

* cited by examiner

Primary Examiner—Tuan T. Lam
Assistant Examiner—Hiep Nguyen
(74) Attorney, Agent, or Firm—Rosalio Haro

(57) ABSTRACT

A voltage conversion circuit incorporate many of what were previously discrete components into a single IC, whereby the number of externally disposed discrete components is reduced as much as possible to reduce the overall size while maintaining high power conversion efficiency. This is achieved by using multiple wells within wells, and coupling the wells to specific voltage potentials to protect the circuit from failure.

42 Claims, 24 Drawing Sheets

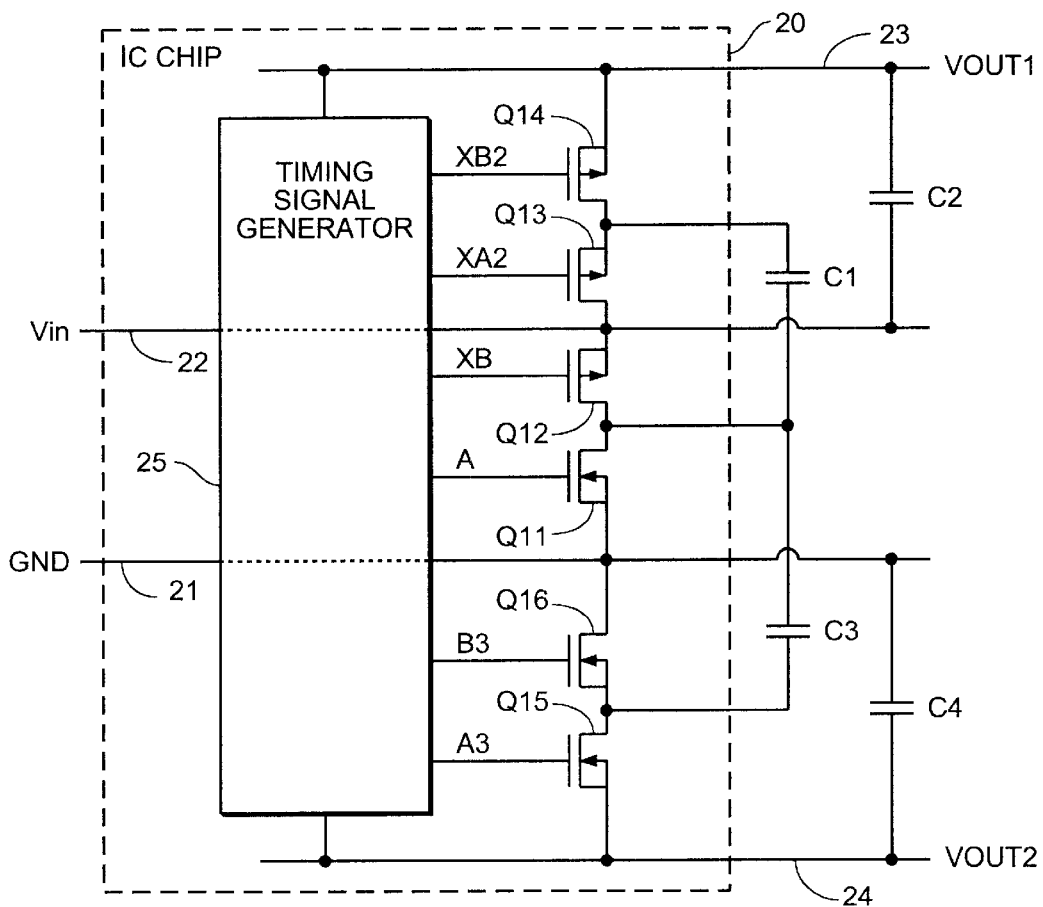
FIG._1
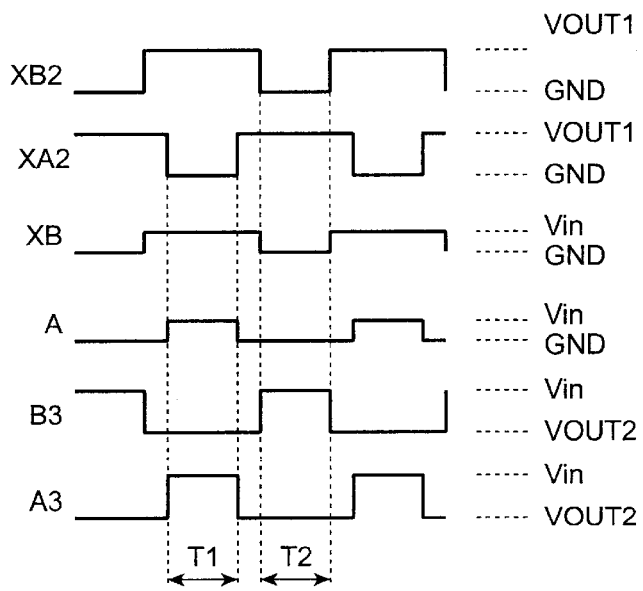
FIG._2

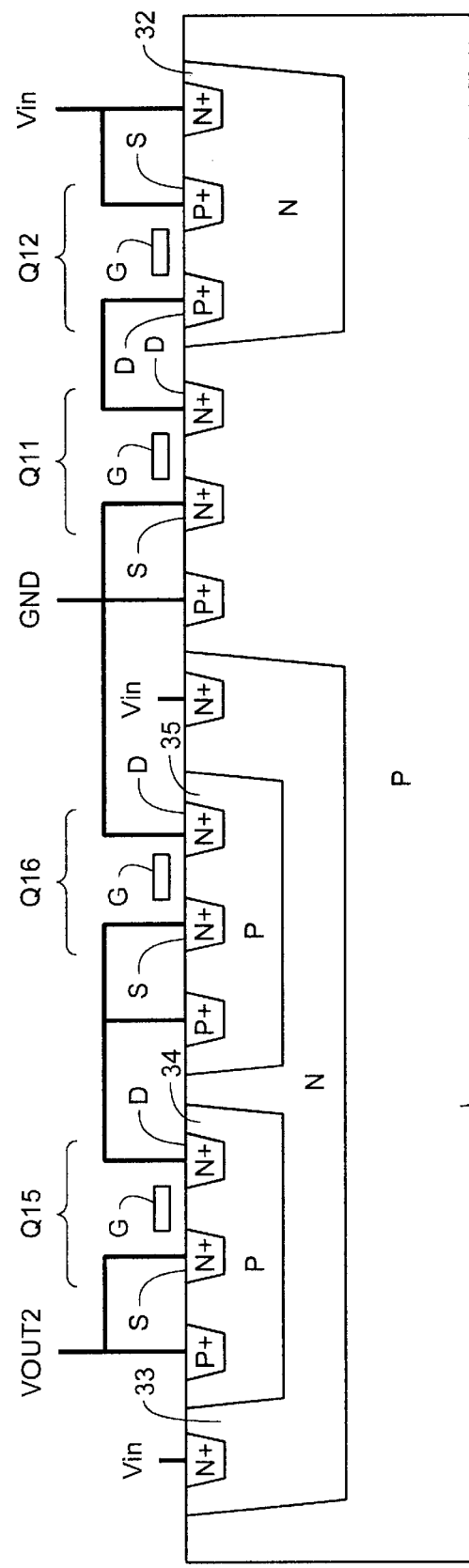
FIG._3

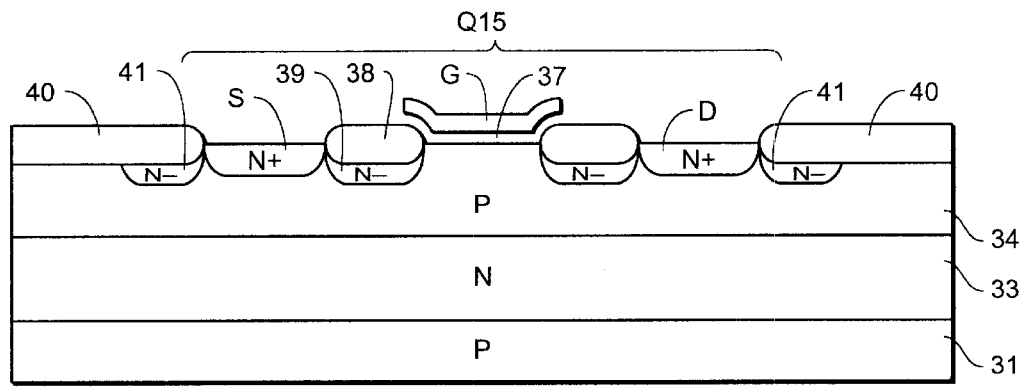
FIG._4
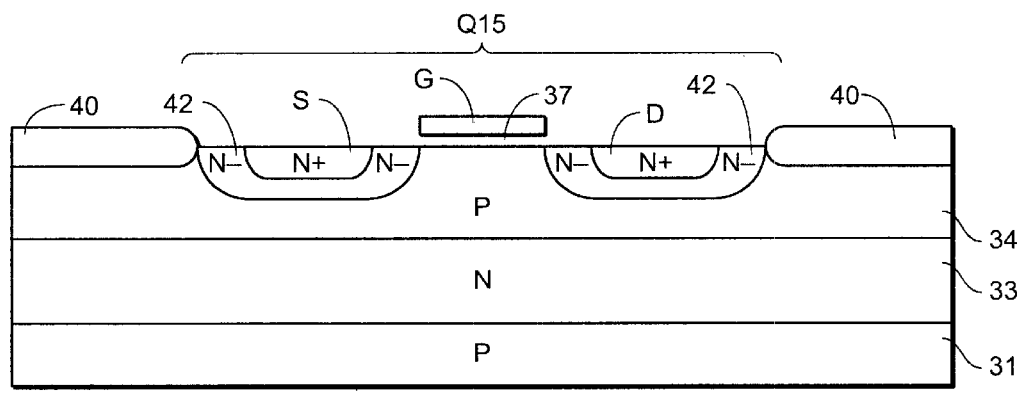
FIG._5
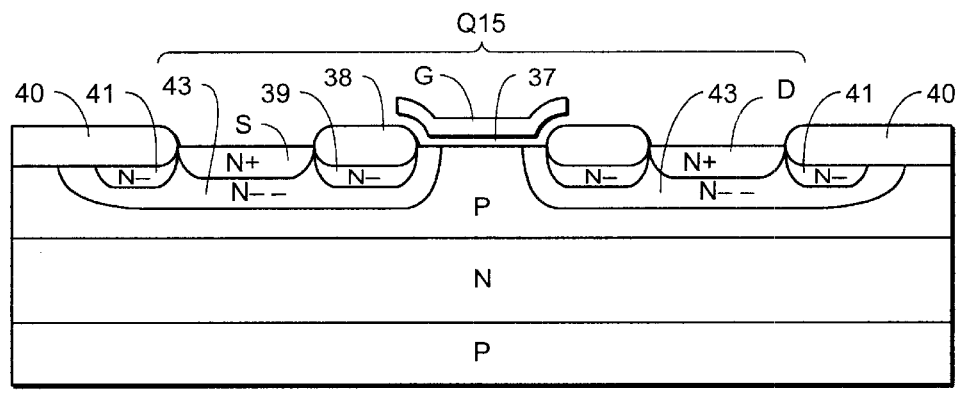
FIG._6

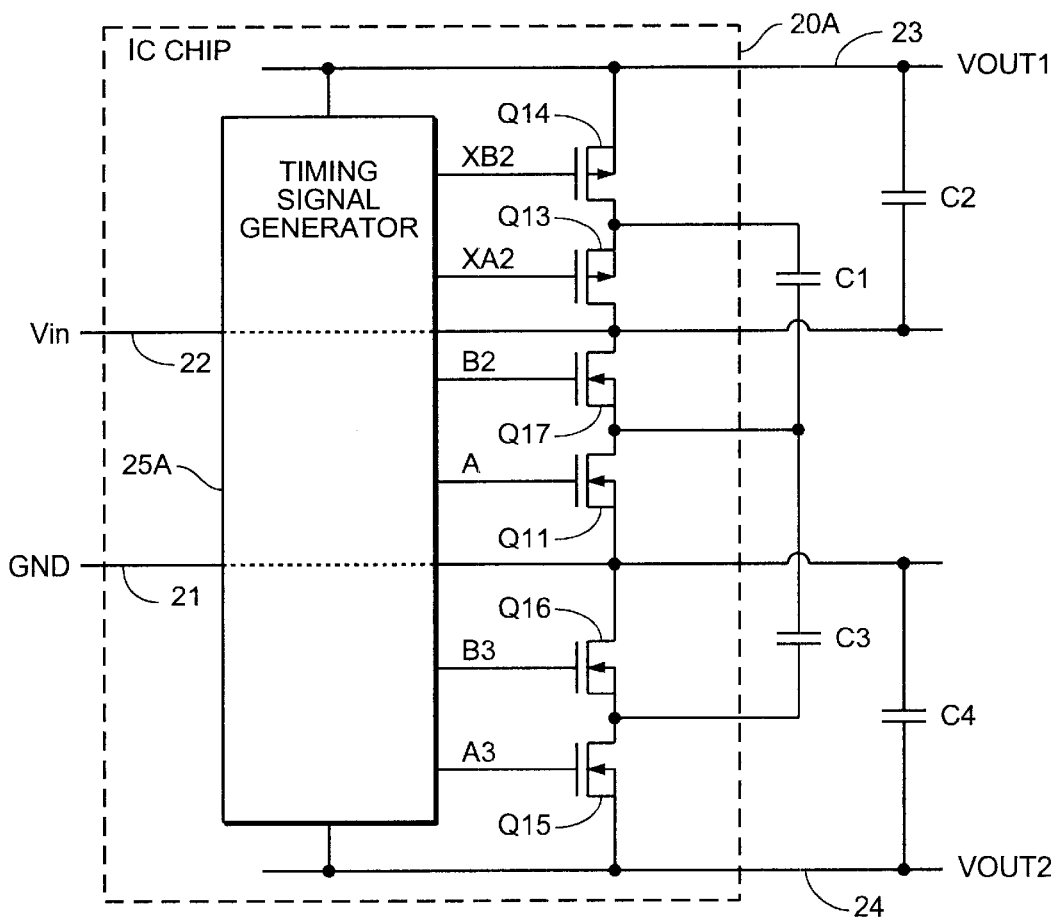
FIG._7
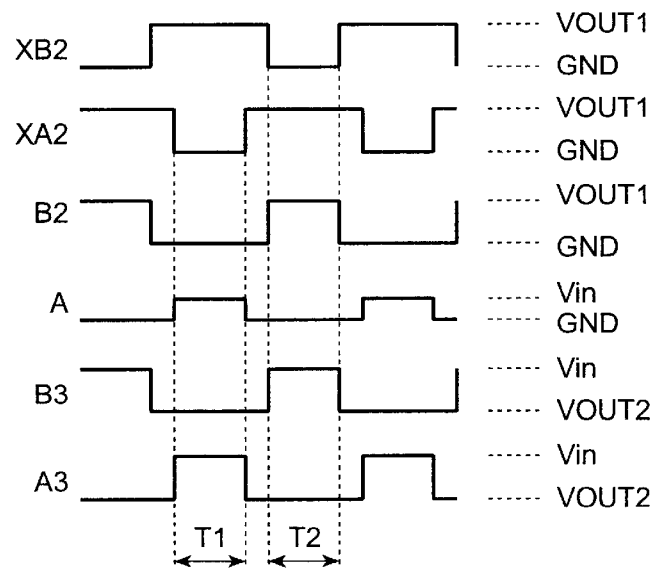
FIG._8

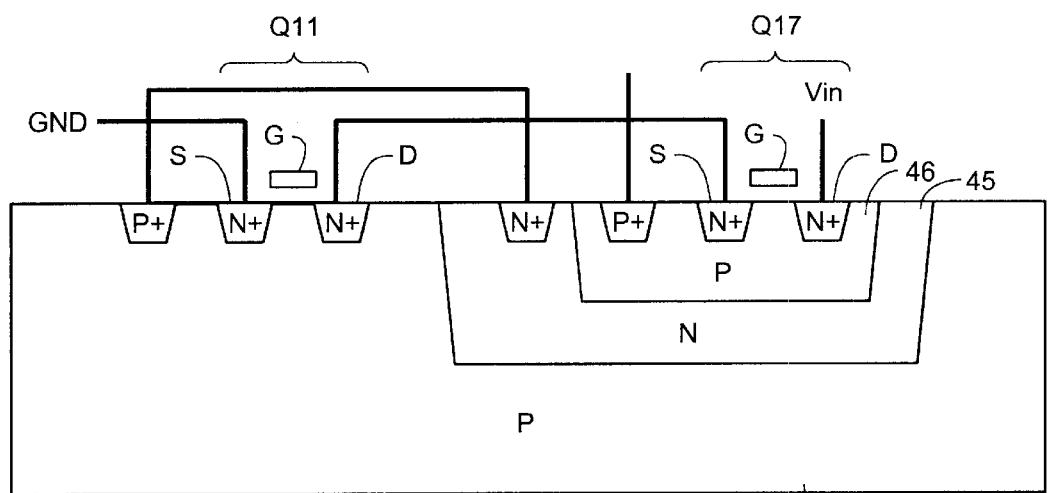
FIG._9
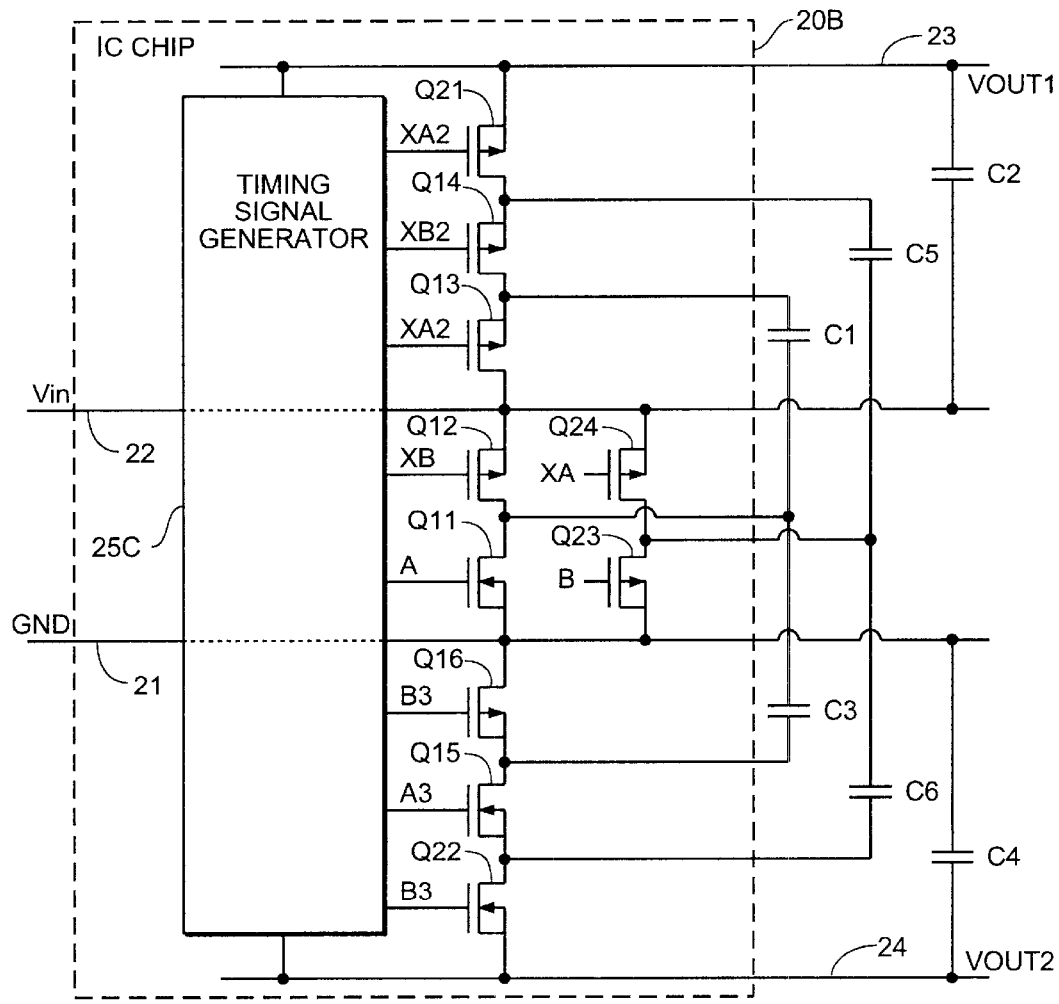
FIG._10

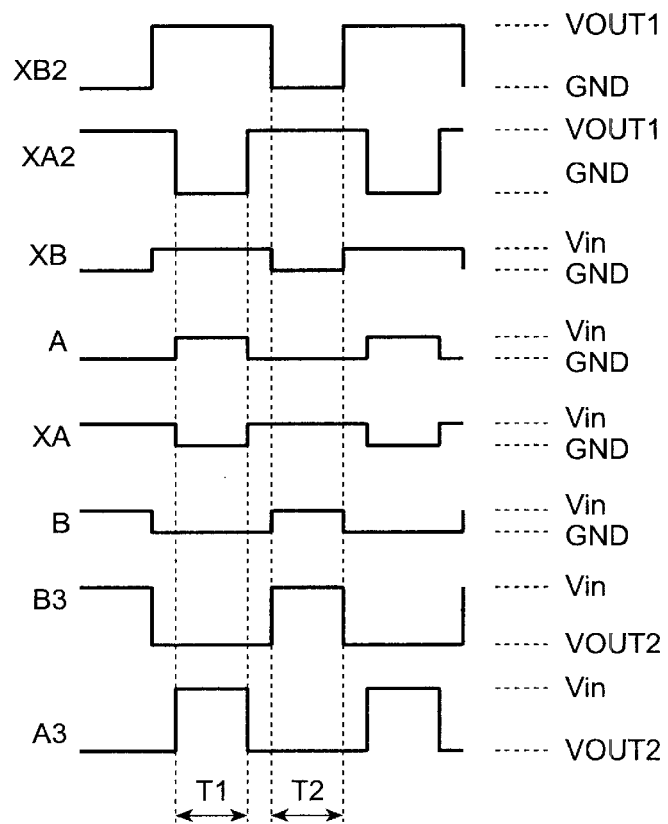
FIG._11
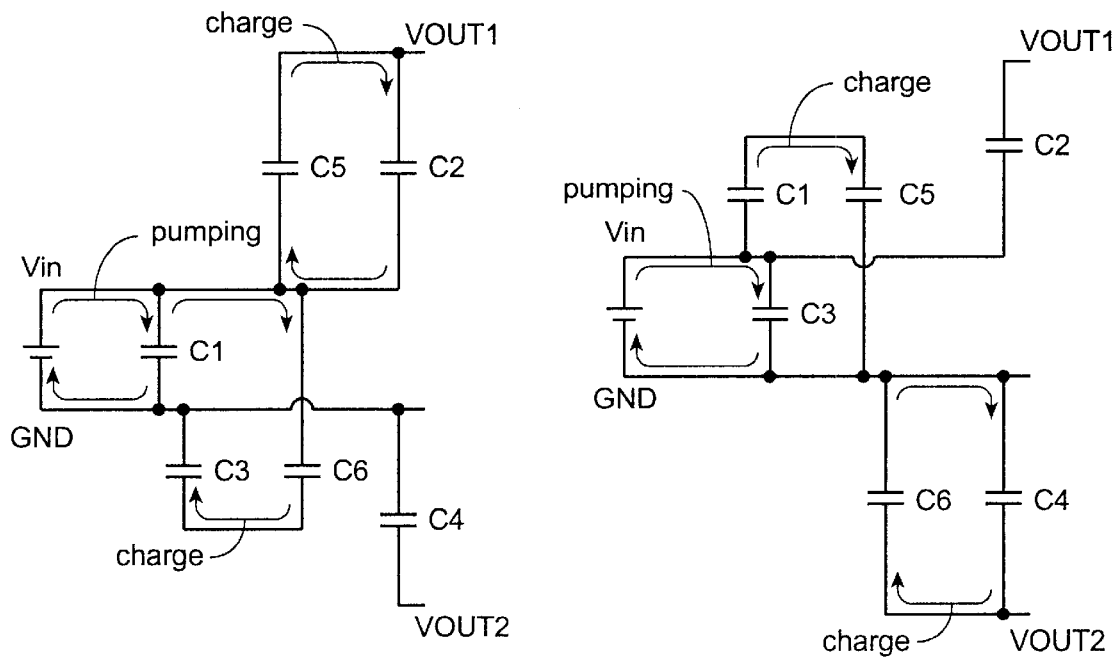
FIG._12A  FIG._12B

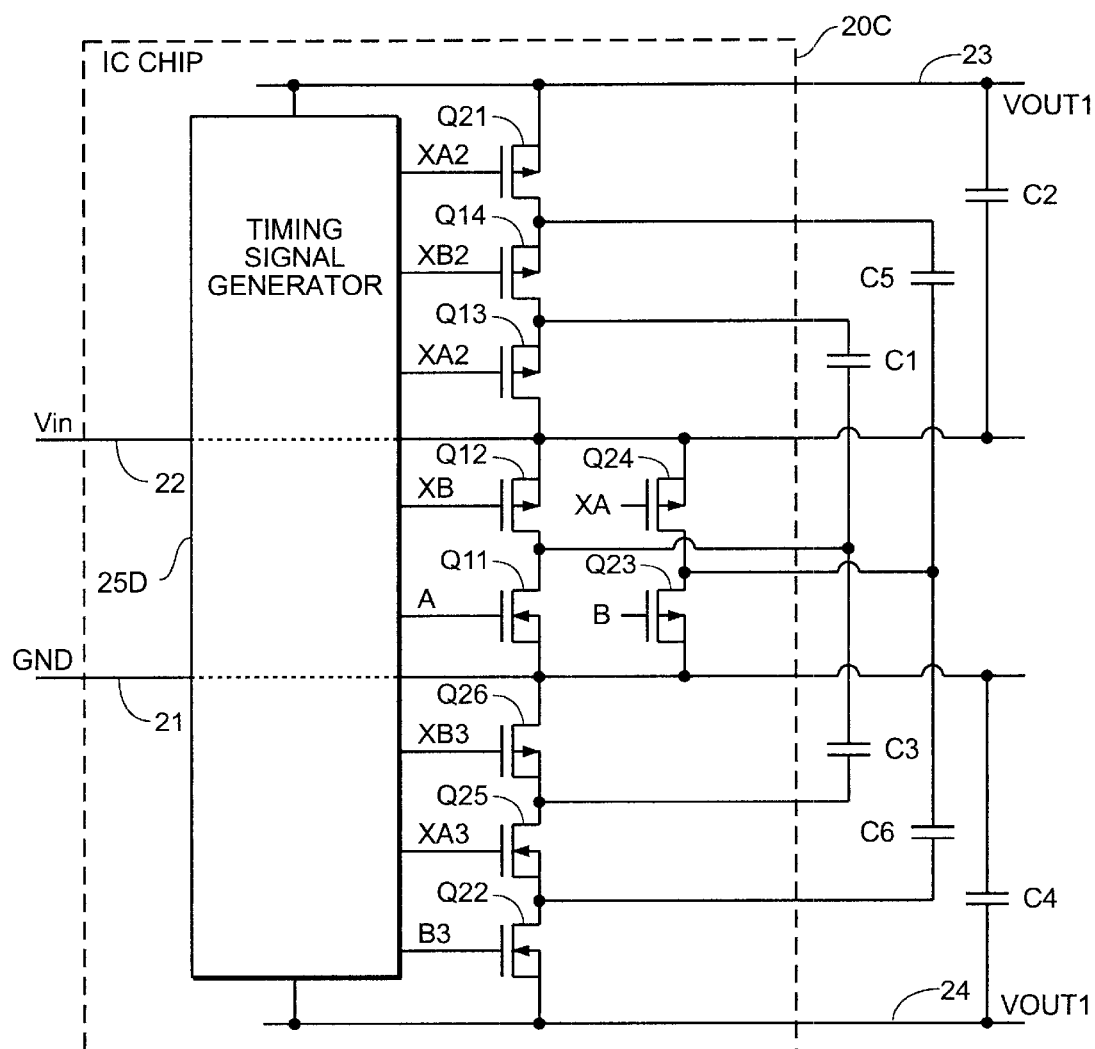
FIG._13

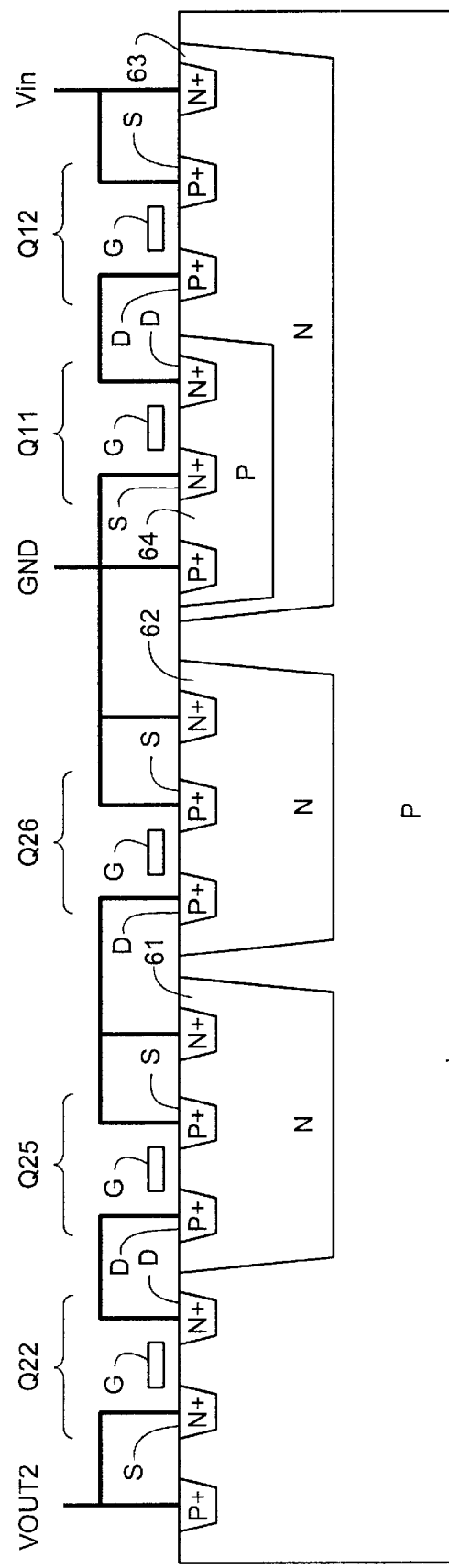
FIG._14

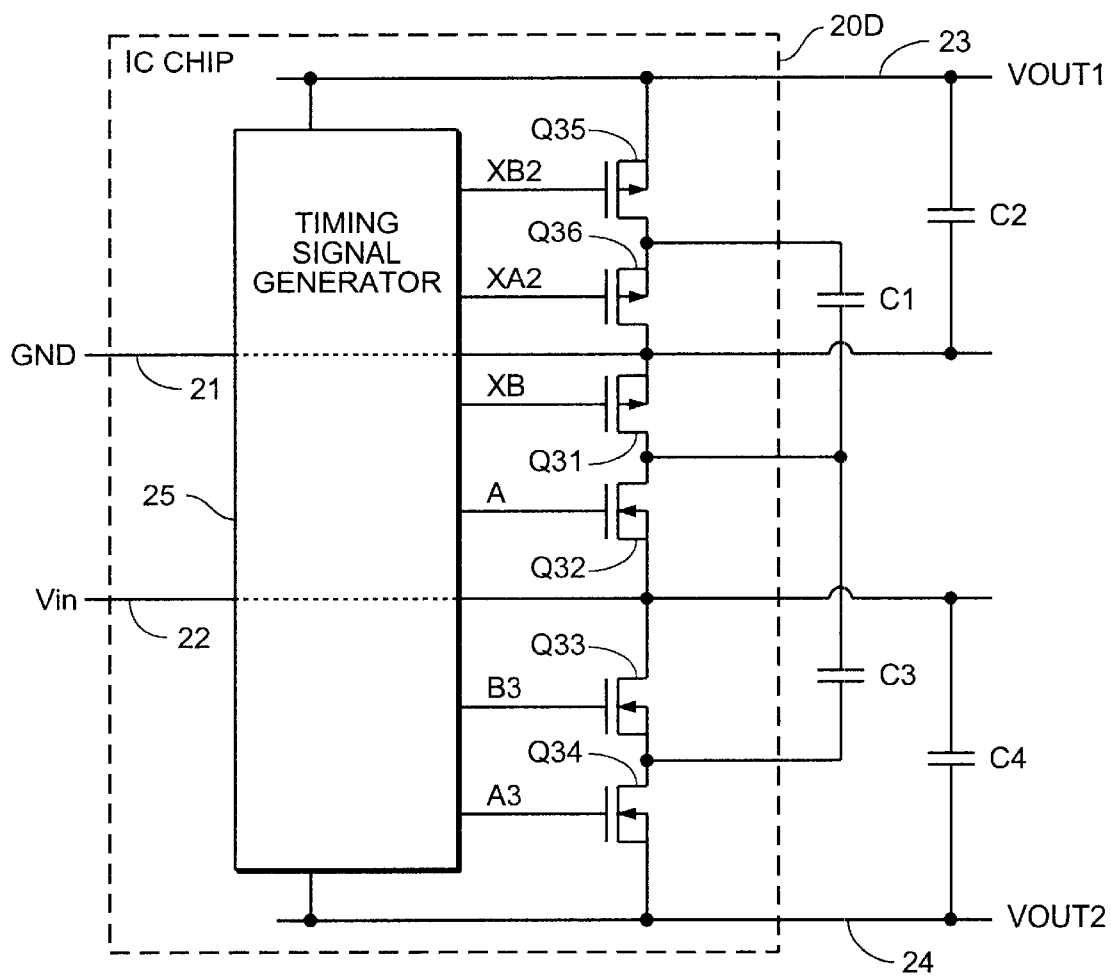
FIG._15

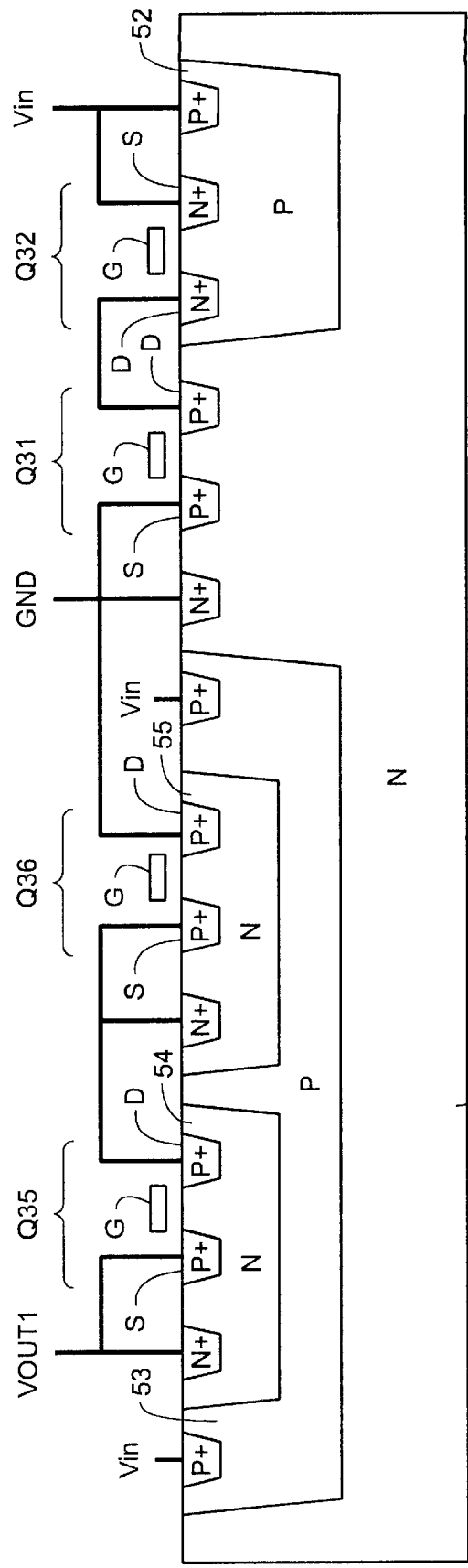
FIG._16

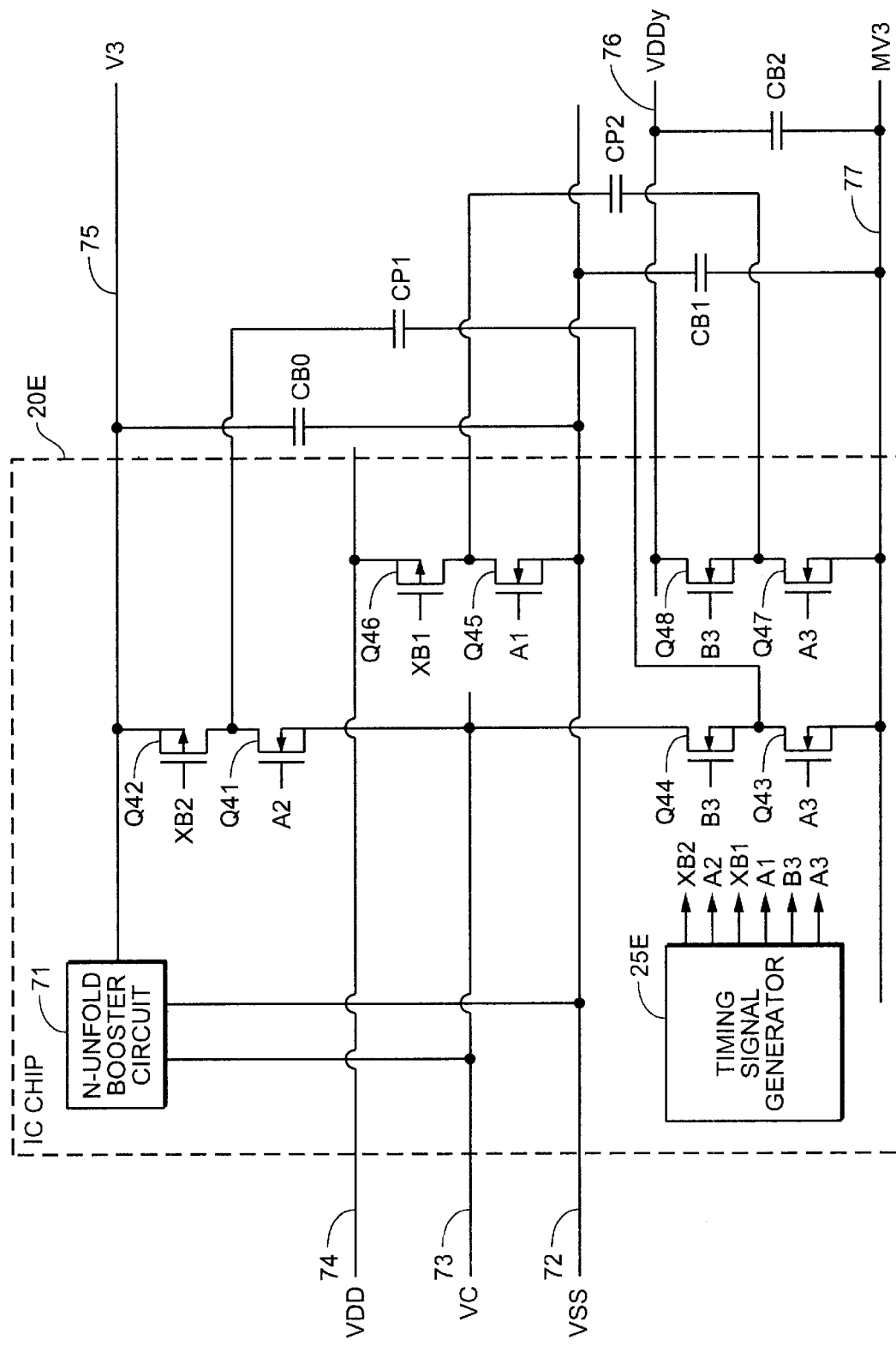
FIG._17

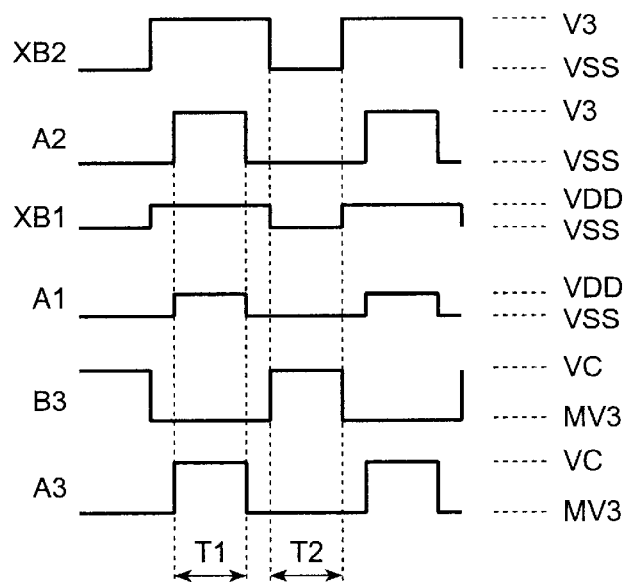
FIG._18
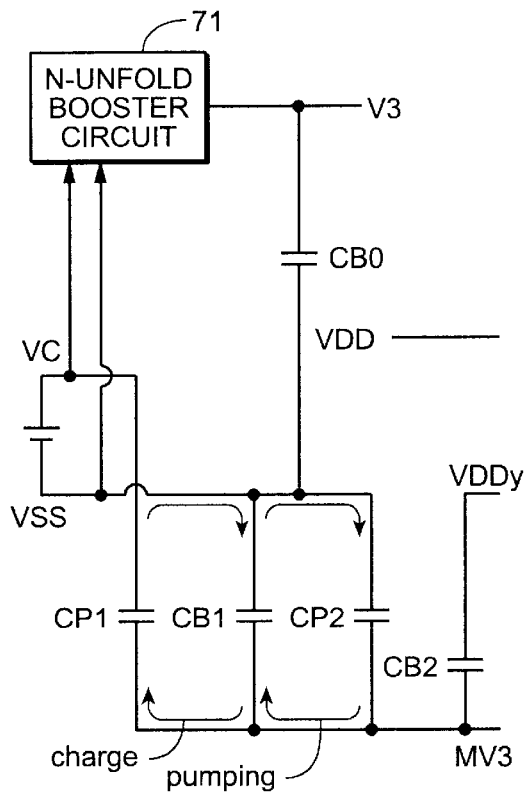
FIG._19A
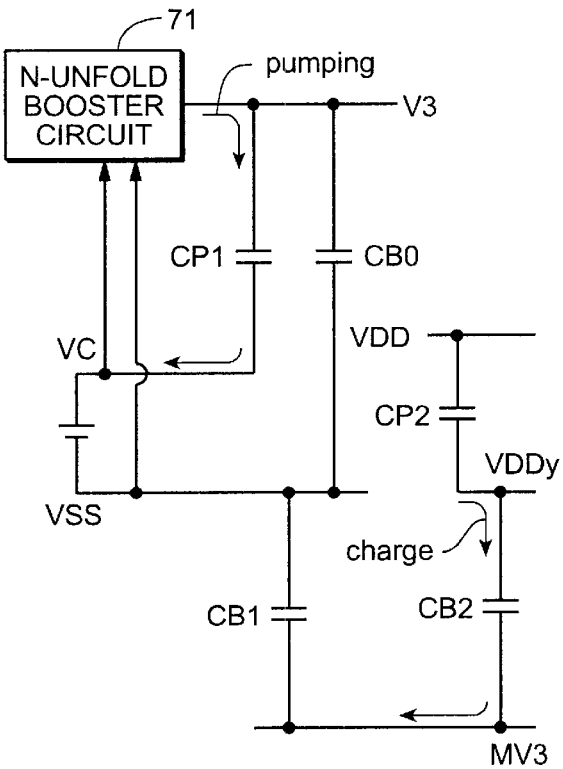
FIG._19B

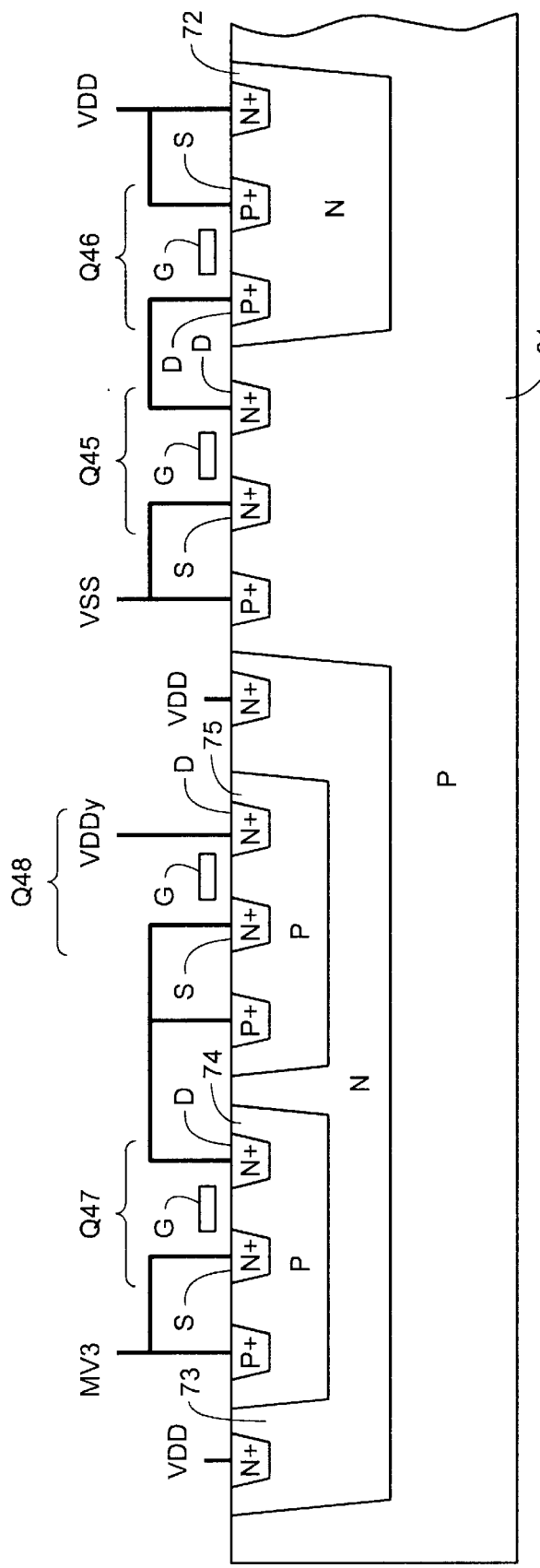
*FIG._20A*
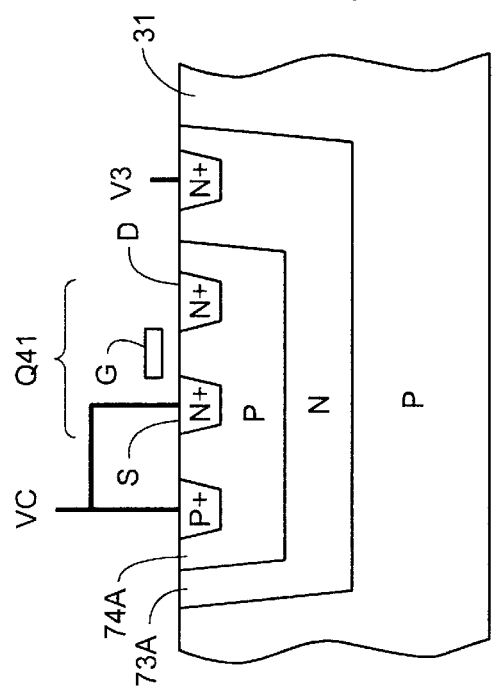
*FIG._20B*

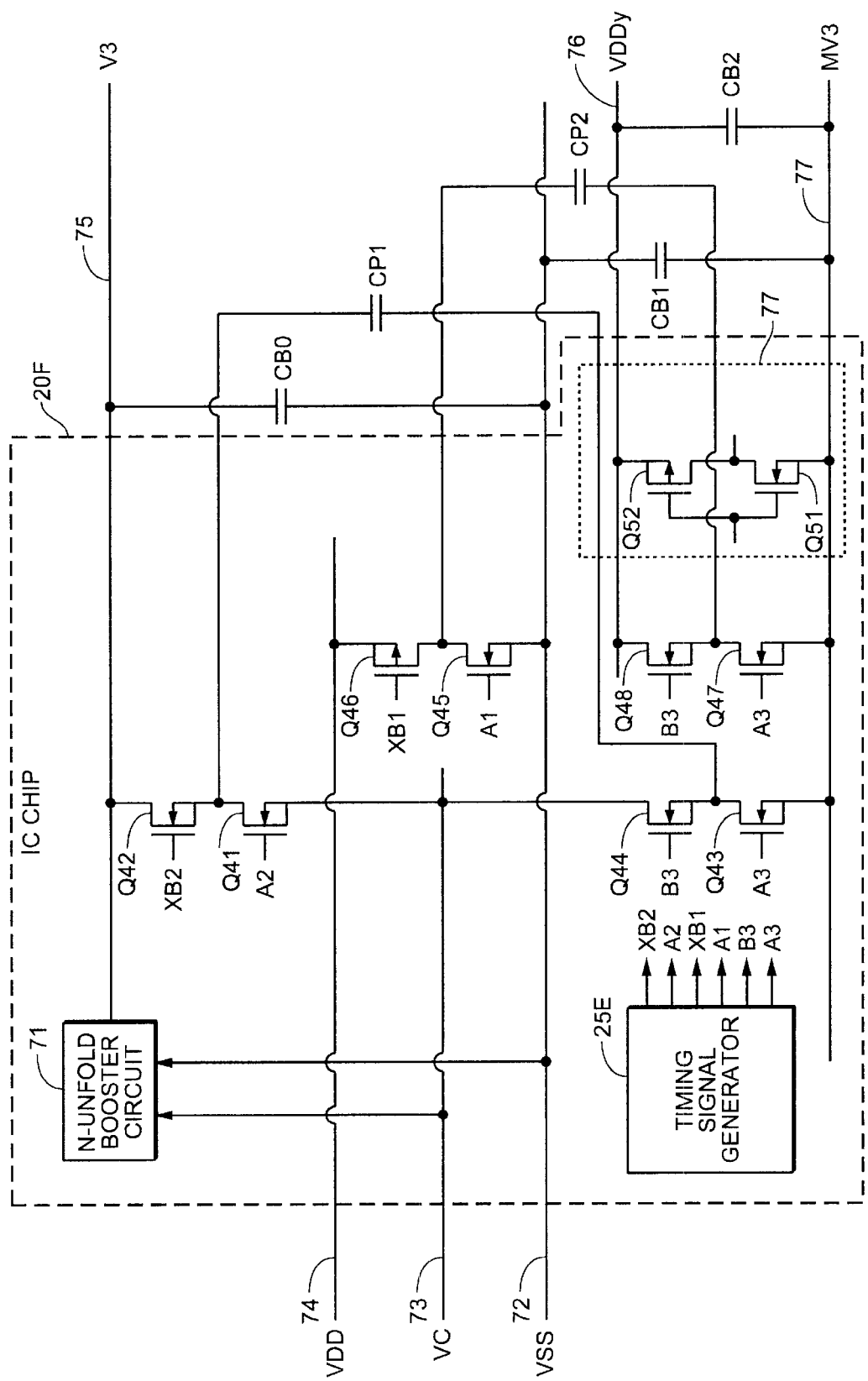
FIG._21

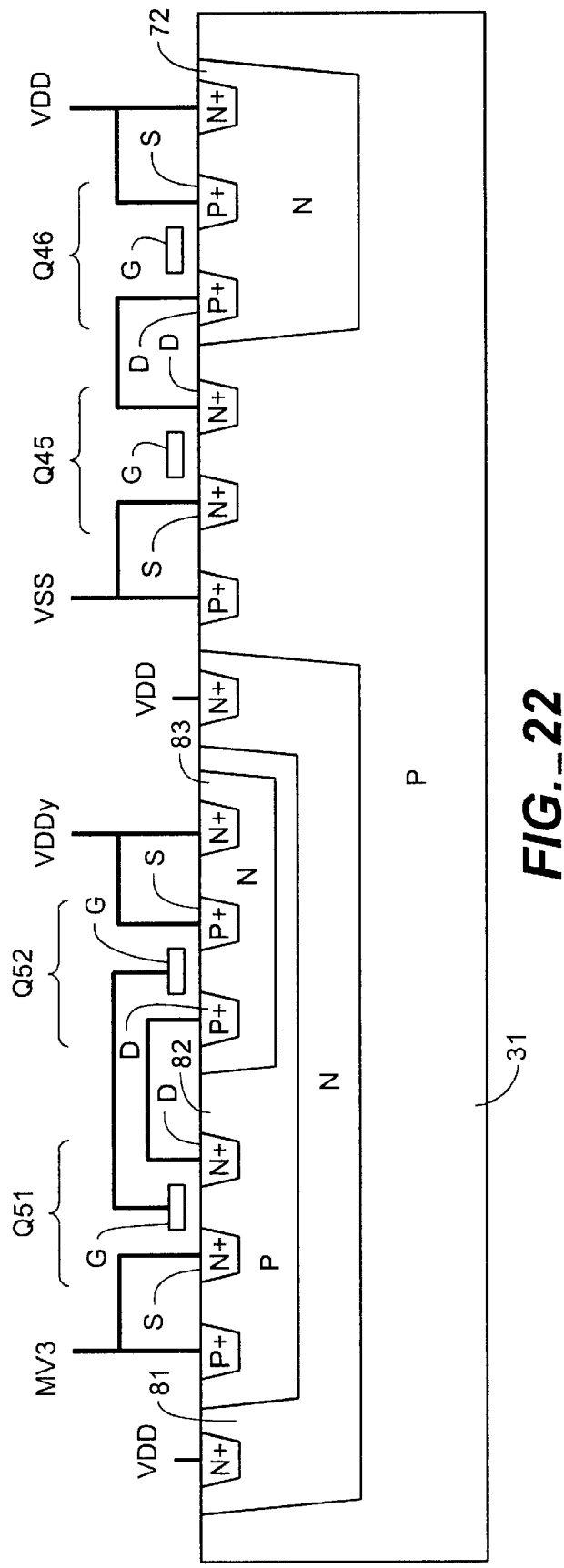
FIG._22

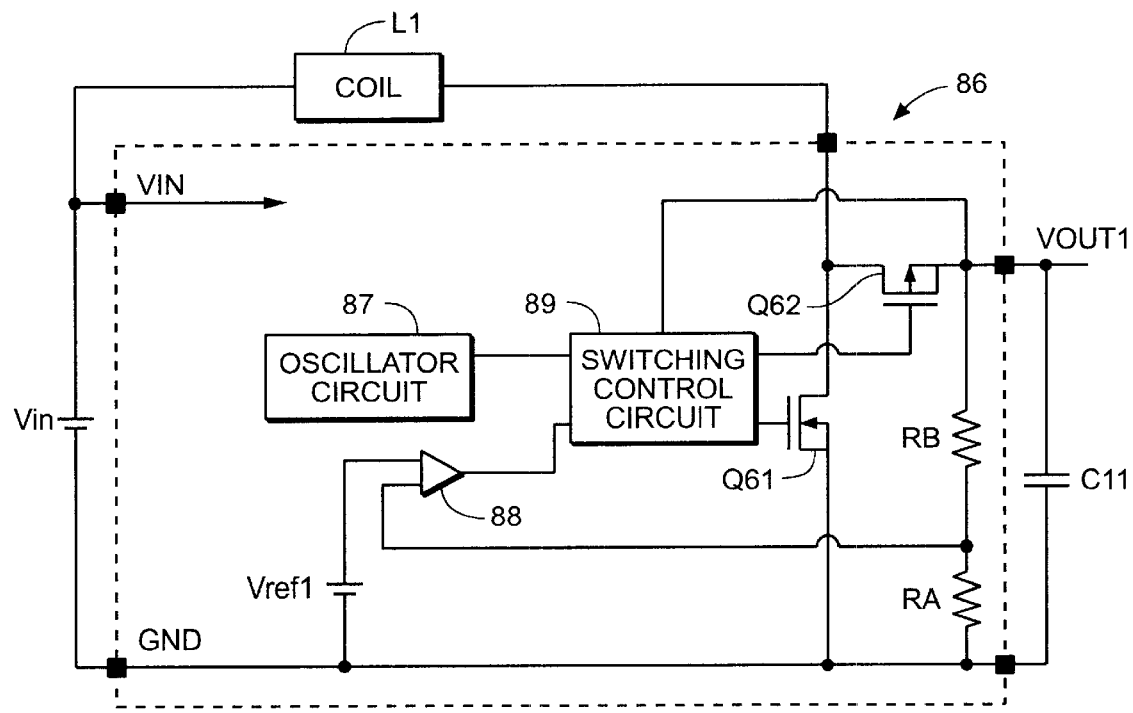
FIG._23

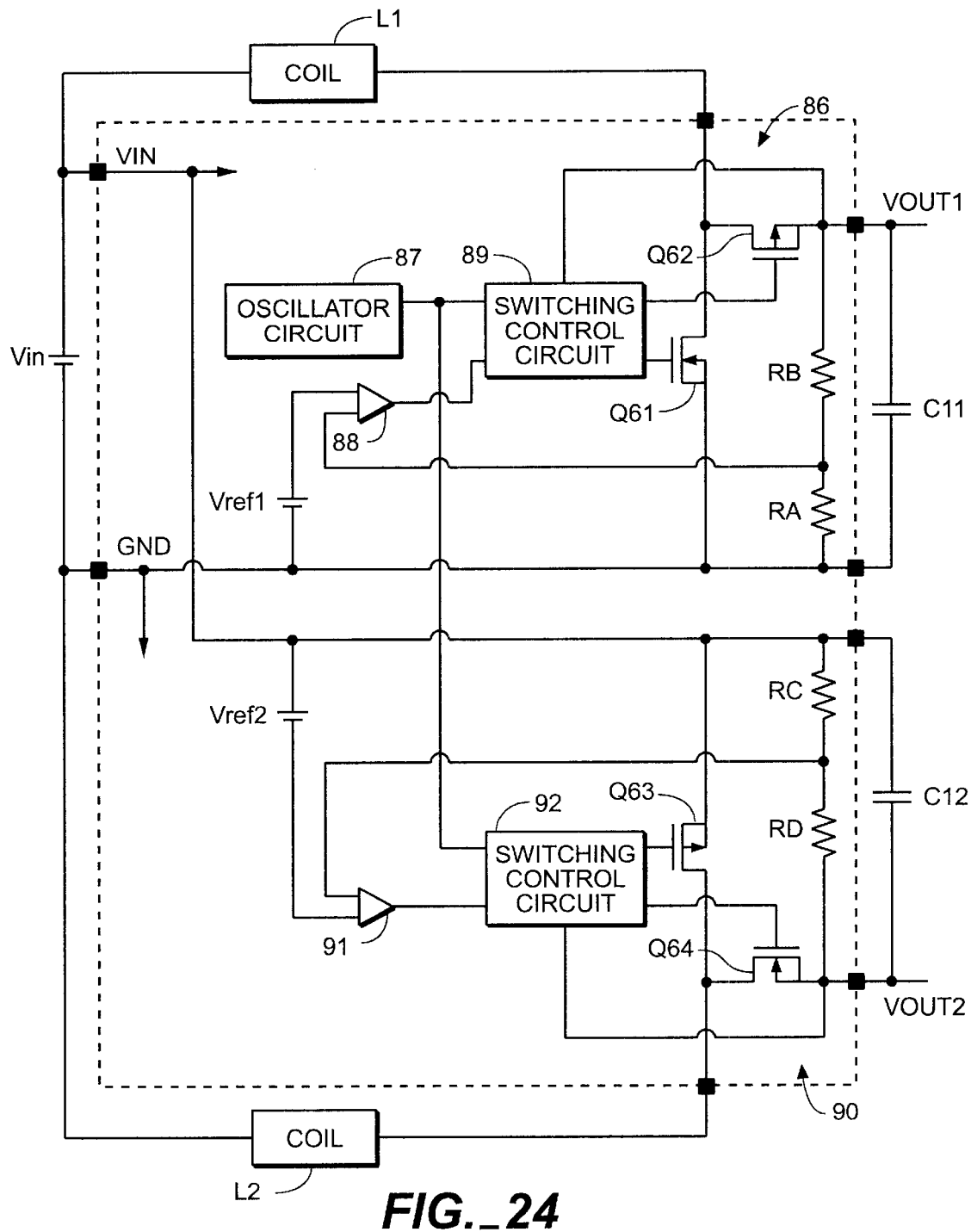
FIG._24

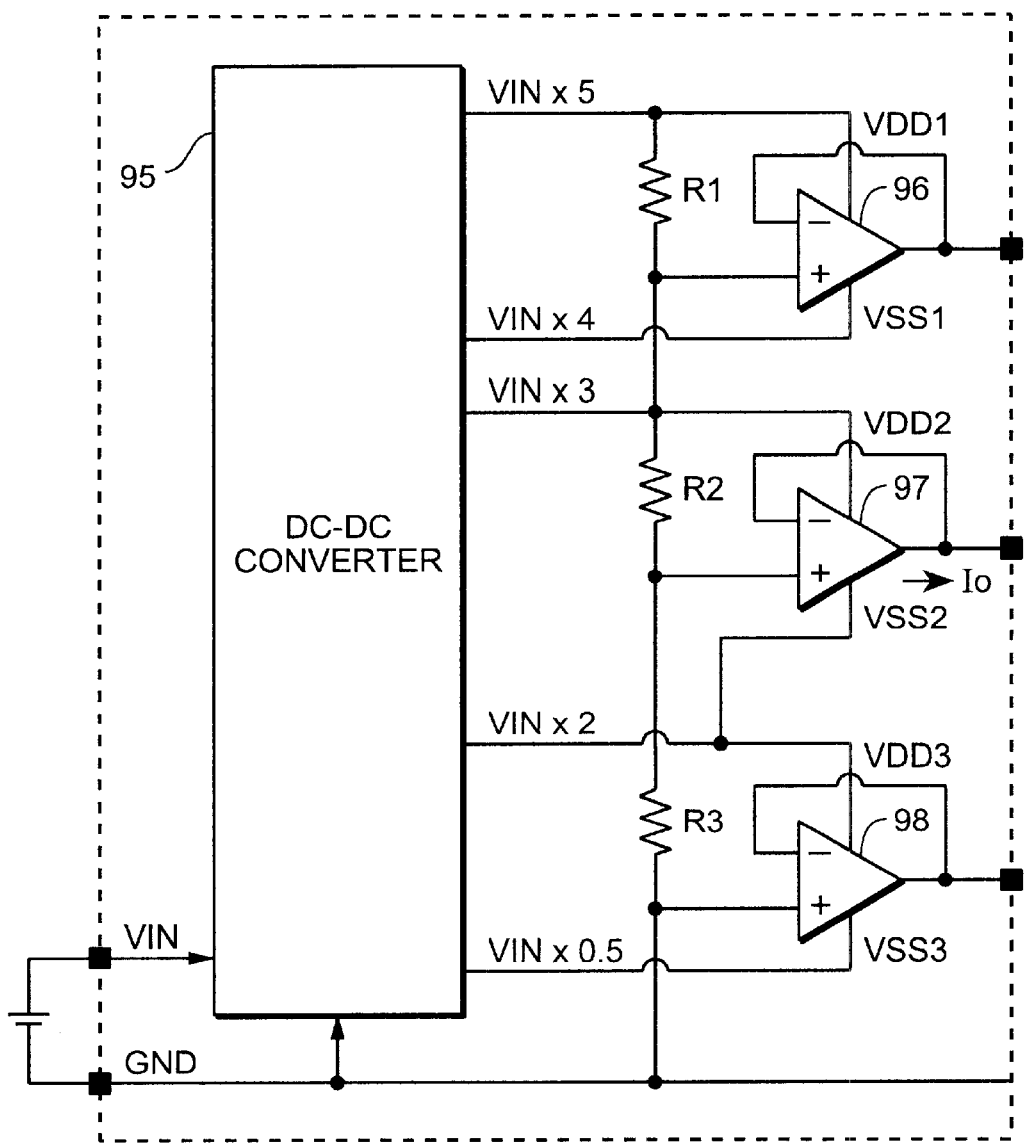
FIG._25

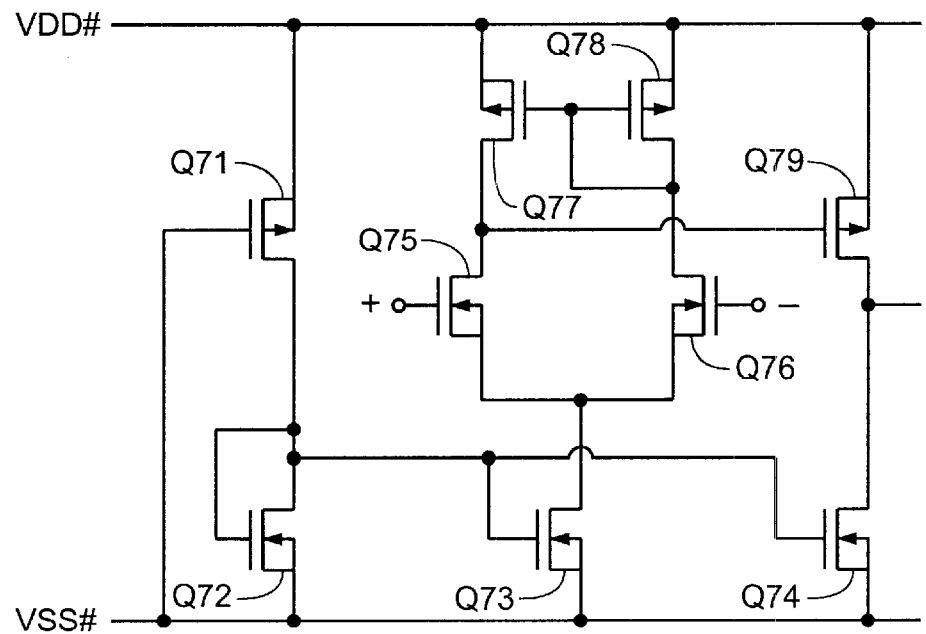
FIG._26
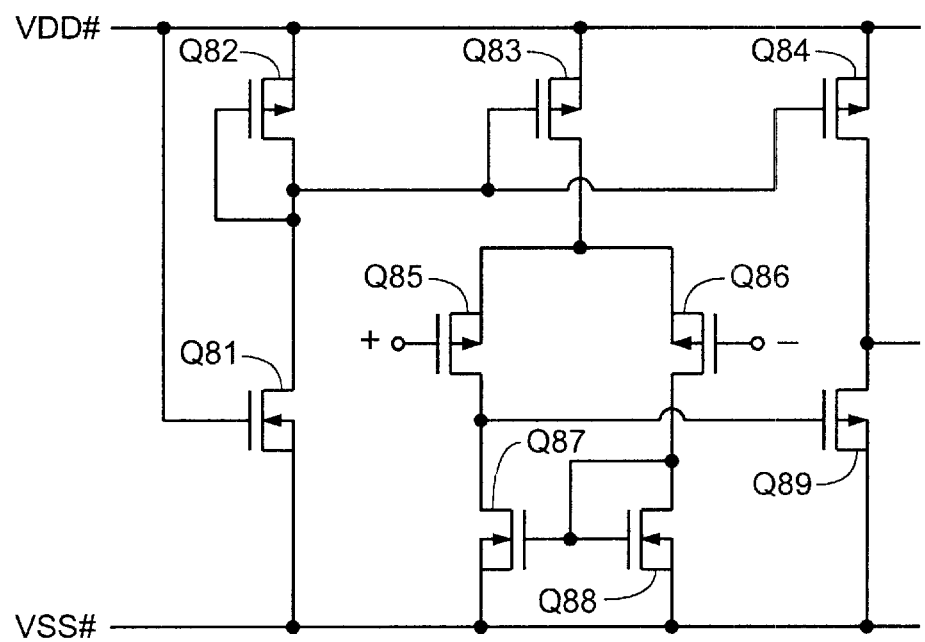
FIG._27

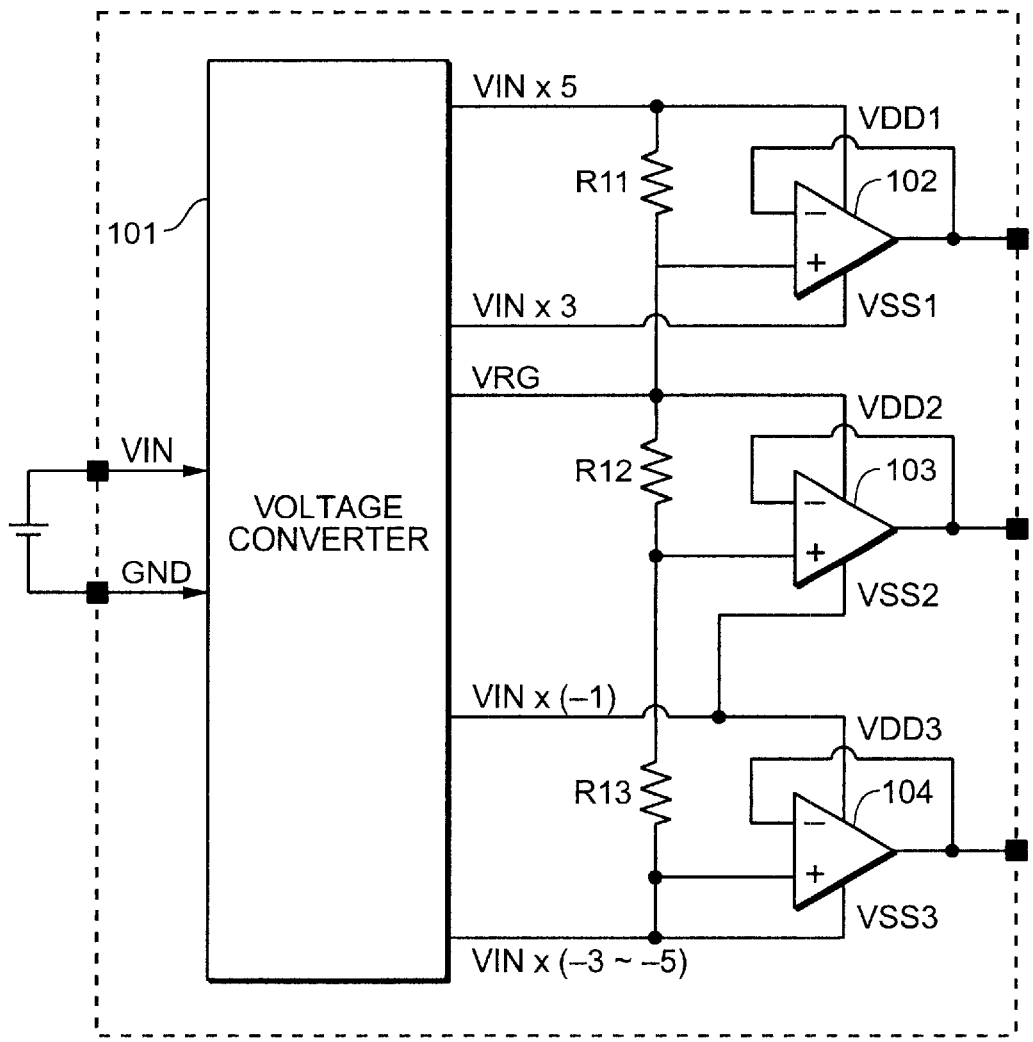
FIG._28

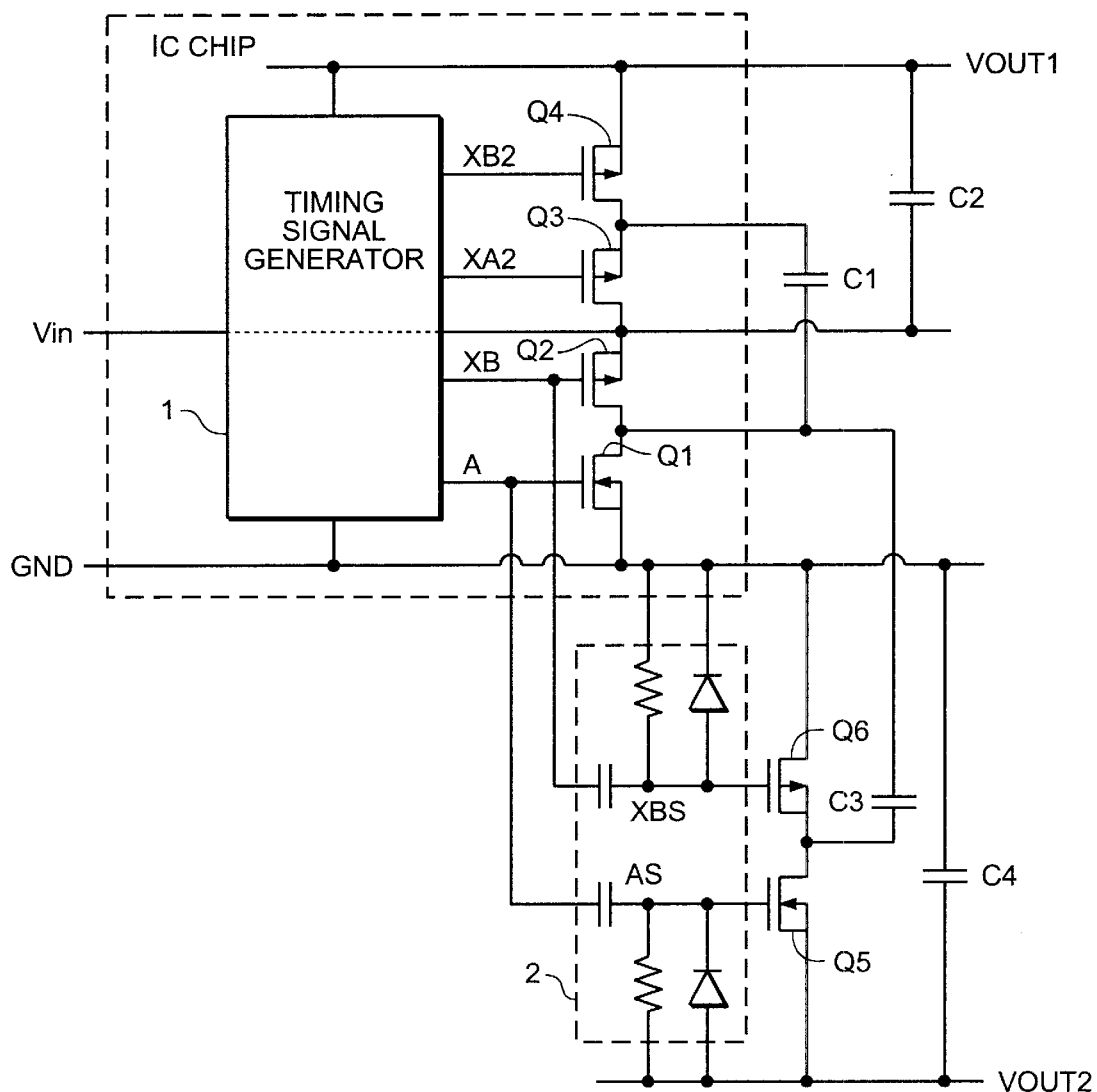
*FIG._29*
PRIOR ART

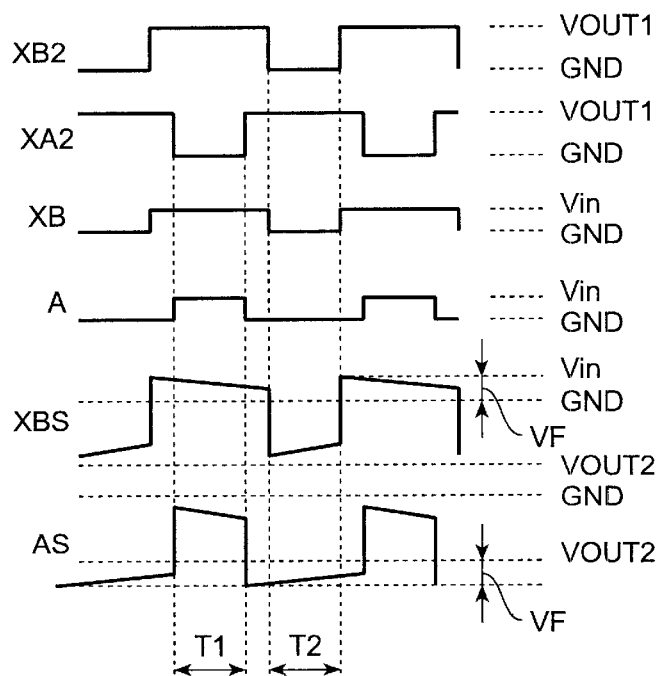
FIG._30
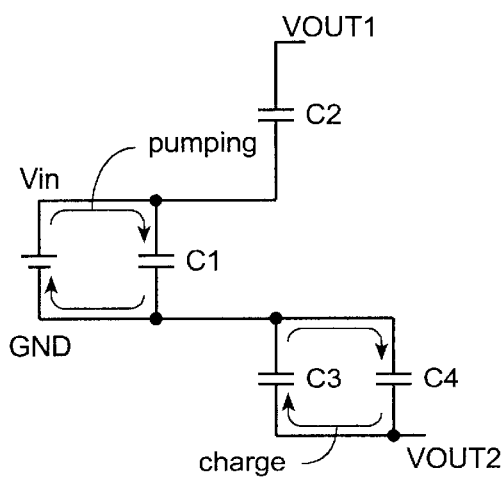
FIG._31A
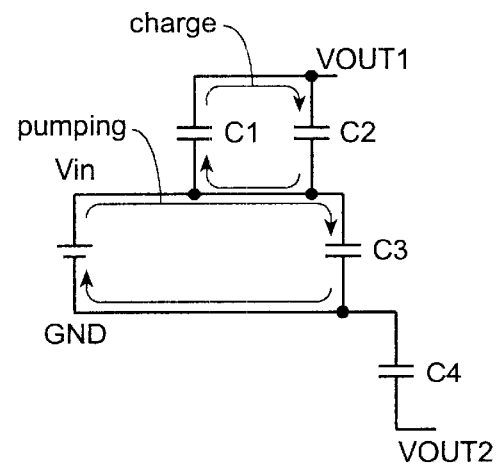
FIG._31B

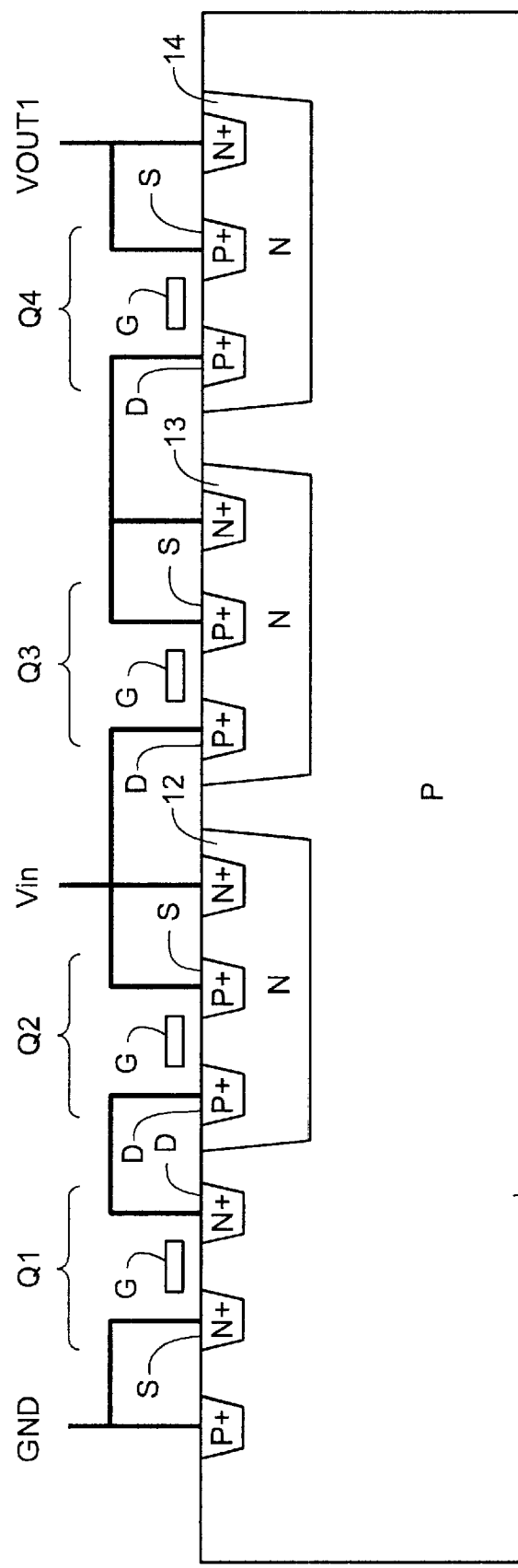
FIG._32

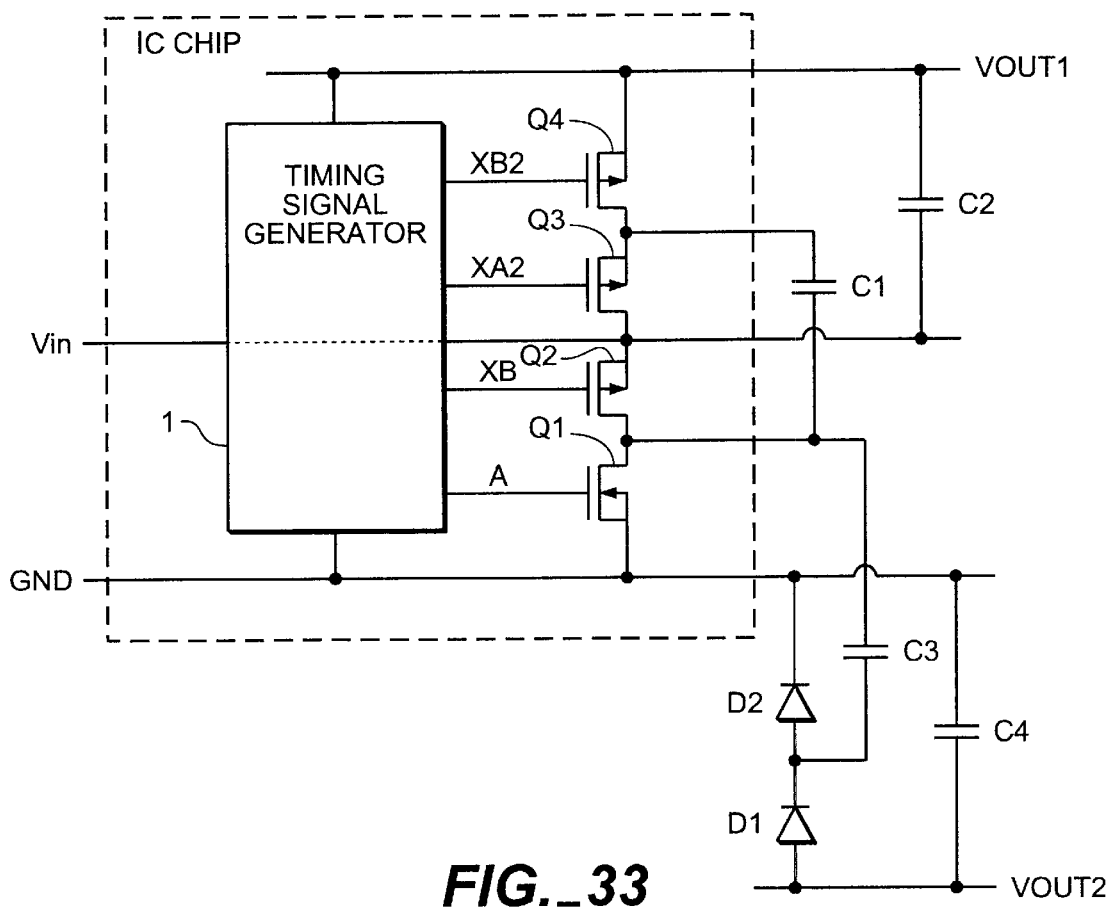
FIG._33
PRIOR ART

VOLTAGE CONVERSION CIRCUIT

BACKGROUND OF THE INVENTION

1. Field of the Invention

The present invention relates to a voltage conversion circuit used, for example, in the power supply of a liquid crystal panel and configured to output two voltages, that is, a positive and negative voltage, based on an input dc voltage.

2. Description of the Related Art

A first example of a voltage conversion circuit of this type according to the prior art (referred to below as first prior art circuit) is shown in FIG. 29.

As shown in FIG. 29 this first prior art circuit has a timing signal generator 1, MOS transistors Q1 to Q6 that are controllably switched ON/OFF by the output from the timing signal generator 1, capacitors C1 and C2 producing a positive voltage twice the dc input voltage Vin according to the ON/OFF operation of MOS transistors Q1 to Q4, capacitors C3 and C4 producing a negative voltage −1 times the dc input voltage Vin according to the ON/OFF operation of MOS transistors Q1, Q2, Q5, and Q6, and a level shift circuit 2.

MOS transistors Q1 and Q5 of MOS transistors Q1 to Q6 are n-type, and MOS transistors Q2 to Q4 and Q6 are p-type. As shown in the figure, level shift circuit 2 consists of resistors, diodes, and the like.

Note also that the timing signal generator 1 and MOS transistors Q1 to Q4 enclosed in the dotted square in FIG. 29 in this first prior art circuit, are integrated onto a single semiconductor substrate forming an IC chip. The level shift circuit 2, MOS transistors Q5 and Q6, and capacitors C1 to C4 are separate components externally connected to the IC chip.

The operation of this first prior art circuit is described next with reference to FIG. 29 to FIG. 31.

The timing signal generator 1 generates and supplies timing signals (control signals) A, XB, XA2, XB2 to the gate of MOS transistors Q1 to Q4, respectively, to switch the MOS transistors Q1 to Q4 ON or OFF. Timing signals A and XB from timing signal generator 1 are level shifted by the level shift circuit 2, which outputs the resulting signals AS and XBS to the gates of MOS transistors Q5 and Q6 to switch MOS transistors Q5 and Q6 ON or OFF.

This operation causes MOS transistors Q1, Q3, Q5 to be ON and MOS transistors Q2, Q4, Q6 to be off in period T1 shown in FIG. 30. The circuit equivalent to operation period T1 is shown in FIG. 31A. Capacitor C1 is charged by the dc source Vin. The positive output voltage VOUT1 is the sum of the source voltage Vin and the stored charge voltage of capacitor C2. At the same time the charge of capacitor C3 is shared with capacitor C4, and the end voltage of capacitor C3 becomes the negative output voltage VOUT2.

In period T2 in FIG. 30 MOS transistors Q2, Q4, Q6 switch on, and MOS transistors Q1, Q3, Q5 switch off. The circuit equivalent to period T2 is shown in FIG. 31B. Capacitor C3 is charged by the dc source Vin, and the negative output voltage VOUT2 is the voltage across capacitor C4. At the same time, the charge of capacitor C1 is shared with capacitor C2, and the positive output voltage VOUT1 becomes the sum of the source voltage Vin and the stored charge voltage of capacitor C1. The voltage drops VF are due to the forward voltage drops of the diodes within the level shift circuit 2. This first prior art circuit thus operates as a charge-pump type dc—dc converter by simply repeating the operation of periods T1 and T2.

As a result of this operation, the values of positive output voltage VOUT1 and negative output voltage VOUT2 from this first prior art circuit can be determined from equations (1) and (2) where the ground GND potential is 0 V.

$$VOUT1 = Vin \cdot 2 \quad (1)$$

$$VOUT2 = Vin \cdot (-1) \quad (2)$$

where Vin is the dc input voltage.

FIG. 32 shows the configuration of the MOS transistors Q1 to Q4 inside the dotted line in FIG. 29 integrated to a semiconductor substrate in this first prior art circuit.

As shown in FIG. 32, reference numeral 11 is a p-type semiconductor substrate. An NMOS transistor Q1 with a source S, gate G, and drain D is formed in this p-type semiconductor substrate 12. Three n-wells 11 to 14 are also formed in p-type semiconductor substrate 11, and PMOS transistors Q2 to Q4 each having a source S, gate G, and drain D are formed in each of these n-wells 12 to 14.

Connections between parts of MOS transistors Q1 to Q4 and the p-type semiconductor substrate 11 are indicated by the bold lines in FIG. 32.

A second example of a voltage conversion circuit of this type according to the prior art (referred to below as second prior art circuit) is described next with reference to FIG. 33.

As shown in FIG. 33, this second prior art circuit replaces MOS transistors Q5 and Q6 of the first prior art circuit with diodes D1, D2, and eliminates the level shift circuit 2. The configuration of other parts is identical to the configuration of the first prior art circuit, and further description thereof is thus omitted.

Operation of this second prior art circuit is basically the same as that of the first prior art circuit except that since the switching devices are diodes, and not complementary MOS transistors, a voltage drop, VFa, equivalent to the forward voltage drop of the diodes is introduced at the output. Therefore, VOUT2 of this embodiment differs from that of the embodiment of FIG. 29 in that the negative output voltage VOUT2 is as shown in equation (3).

$$VOUT2 = [Vin \cdot (-1)] + [VFa \cdot 2] \quad (3)$$

where VFa is the forward voltage drop of diodes D1, D2.

A problem with the first prior art circuit as shown in FIG. 29 is that it is not possible to reduce the overall size of the circuit because of the many externally connected components, including parts of the level shift circuit 2 and MOS transistors Q5 and Q6.

Furthermore, because a level shift circuit 2 is needed, the level of timing signal A from timing signal generator 1 is gradually lowered by level shift circuit 2, resulting in signal AS (see FIG. 30) being applied to the gate of MOS transistor Q5. This drop increases if the frequency of signal AS is low, and potentially adversely affects the operation of MOS transistor Q5.

The second prior art circuit has an advantage over the first prior art circuit in that there are fewer external parts. However, the negative output voltage VOUT2 is decreased by the forward voltage VFa component of the diode as shown by equation (3), and power conversion efficiency thus drops.

OBJECTS OF THE INVENTION

Therefore, with consideration for the above problems, an object of the present invention is to provide a voltage conversion circuit that reduces the number of external parts as much as possible and thus enables an overall reduction in size while maintaining high power conversion efficiency.

SUMMARY OF THE INVENTION

To resolve the above problems, a voltage conversion circuit includes a plurality of MOS transistors that are switched ON/OFF to charge a capacitance with an input dc voltage, and this charging voltage is used to convert the input dc voltage to a specific positive and negative output voltage, wherein: the plural MOS transistors include PMOS and NMOS transistors for positive voltage conversion, and a NMOS transistor for negative voltage conversion; the NMOS transistors for positive voltage conversion are formed in a p-type semiconductor substrate; the PMOS transistors for positive voltage conversion are formed in an n-type first well formed in the p-type semiconductor substrate; and the NMOS transistor for negative voltage conversion is formed in a p-type third well, which is formed in an n-type second well formed in the p-type semiconductor substrate.

The present invention can thus form the MOS transistors used for voltage conversion in the same p-type semiconductor substrate, and can therefore reduce the external components to capacitors only. It is therefore possible to reduce the overall size while maintaining a high power conversion efficiency.

The present invention can alternatively be implemented as a voltage conversion circuit having a plurality of MOS transistors that are switched ON/OFF to charge a capacitance with an input dc voltage, and using this charging voltage to convert the input dc voltage to a specific positive and negative output voltage, wherein: the plural MOS transistors include PMOS and NMOS transistors for positive voltage conversion, and an NMOS transistor for negative voltage conversion; a specific NMOS transistor for positive voltage conversion is formed in a p-type semiconductor substrate; the PMOS transistors for positive voltage conversion are formed in an n-type first well formed in the p-type semiconductor substrate; and a NMOS transistors for positive voltage conversion other than said specific NMOS transistor, and the NMOS transistor for negative voltage conversion, are formed in a p-type third well, which is formed in an n-type second well formed in the p-type semiconductor substrate.

This embodiment of the invention can thus form the MOS transistors used for voltage conversion in the same p-type semiconductor substrate, and can therefore reduce the external components to capacitors only. It is therefore possible to reduce the overall size while maintaining high power conversion efficiency.

Furthermore, the NMOS transistor for positive voltage conversion is also isolated from a substrate bias effect with the invention described in claim 2, and problems such as an increased threshold value therefore do not occur.

In a third embodiment of the present invention includes a voltage conversion circuit having a plurality of MOS transistors that are switched ON/OFF to charge a capacitance with the input dc voltage, and using this charging voltage to convert the input dc voltage to a specific positive and negative output voltage, wherein: the plural MOS transistors include PMOS and NMOS transistors for positive voltage conversion, and PMOS and NMOS transistors for negative voltage conversion; the NMOS transistors for negative voltage conversion are formed in a p-type semiconductor substrate; the PMOS transistors for positive voltage conversion and PMOS transistors for negative voltage conversion are formed in an n-type first well formed in the p-type semiconductor substrate; and the NMOS transistors for positive voltage conversion are formed in a p-type third well, which is formed in an n-type second well formed in the p-type semiconductor substrate.

This third embodiment of the invention can thus form the MOS transistors used for voltage conversion in the same p-type semiconductor substrate, and can therefore reduce the external components to capacitors only. It is therefore possible to reduce the overall size while maintaining high power conversion efficiency.

Additionally, with the third embodiment of the present invention, substrate biasing to a potential lower than the ground potential is prevented, and PMOS transistors can therefore be used as the MOS transistors producing a negative potential.

Alternatively, a fourth embodiment of the present invention is a voltage conversion circuit having a plurality of MOS transistors that are switched ON/OFF to charge a capacitance with the input dc voltage, and using this charging voltage to convert the input dc voltage to a specific positive and negative output voltage, wherein: the plural MOS transistors include PMOS and NMOS transistors for negative voltage conversion, and PMOS transistors for positive voltage conversion; the PMOS transistors for negative voltage conversion are formed in an n-type semiconductor substrate; the NMOS transistors for negative voltage conversion are formed in a p-type first well in the n-type semiconductor substrate; and the PMOS transistors for positive voltage conversion are formed in an n-type third well, which is formed in a p-type second well formed in the n-type semiconductor substrate.

The fourth embodiment of the present invention can thus form the MOS transistors in the same n-type semiconductor substrate, and can therefore reduce the external components to capacitors only. It is therefore possible to reduce the overall size while maintaining high power conversion efficiency.

Alternatively, the first through fourth embodiments can further include an ON/OFF control means for switching the plural MOS transistors ON/OFF, the ON/OFF control means can be formed in the p-type or n-type semiconductor substrate.

In any of the embodiments, it is also preferably that at least one of the MOS transistors has an offset area in the semiconductor substrate around the gate insulation layer, the offset area being a low concentration impurity layer disposed below a LOCOS layer in the semiconductor substrate.

By providing a low concentration impurity layer as an offset region below a LOCOS (local oxidation of silicon) layer in the invention, the offset region can be made deep relative to the channel area when compared with a configuration in which a LOCOS layer is not formed. As a result, the field around the drain is effectively saturated, the withstand voltage of the drain is increased, and a high withstand voltage can be achieved.

Alternatively, in any of the embodiments, a voltage producing a potential is applied between the semiconductor substrate and second well to assure that they remain in reverse bias condition, or at the same potential during operation. Additionally, and a voltage producing a reverse bias during operation is applied between the second well and third well.

Alternatively, the invention may be implemented with a booster circuit for boosting an input dc voltage n-fold and plurality of MOS transistors, outputting the boosted voltage of the booster circuit as a positive voltage, switching the plural MOS transistors ON/OFF to charge a capacitance with at least the boosted voltage of the booster circuit, and using this charging voltage to produce a negative voltage, wherein: the plural MOS transistors include PMOS and NMOS transistors used for generating the negative voltage; specific NMOS transistors are formed in a p-type semiconductor substrate; the PMOS transistors are formed in an n-type first well formed in the p-type semiconductor substrate; and specific NMOS transistors are formed in a p-type third well, which is formed in an n-type second well formed in the p-type semiconductor substrate.

The invention in this embodiment can thus form the MOS transistors used for voltage conversion in the same p-type semiconductor substrate, and can therefore reduce the external components to capacitors only. It is therefore possible to reduce the overall size while maintaining high power conversion efficiency.

This same embodiment can further include an ON/OFF control means for switching the plural MOS transistors ON/OFF. The ON/OFF control means and the booster circuit can be formed on the p-type semiconductor substrate.

Additionally, at least one of the MOS transistors can have an offset area in the semiconductor substrate around the gate insulation layer, the offset area being a low concentration impurity layer disposed below a LOCOS layer in the semiconductor substrate. This permits the invention to achieve a high withstand voltage.

In this same embodiment, it is preferably that the semiconductor substrate and second well received a voltage to assure that they are maintained reversed biased, or at the same potential, during operation. Also, a voltage producing a reverse bias condition between the second well and third well during operation, is preferably applied.

Lastly, the an n-type fourth well may further be formed in the third well, and a PMOS transistor used for a logic circuit or a PMOS transistor used for generating a negative voltage is formed inside the fourth well.

Means of Resolution

This circuit has the timing signal generator and MOS transistors integrated into the same p-type semiconductor substrate, thus forming an IC chip, with capacitors externally connected to the IC chip. At least one NMOS transistor is formed in the p-type semiconductor substrate, while PMOS transistors are formed in a first well of n-type conductivity formed in the p-type semiconductor substrate. Other NMOS transistors are formed in a third well of p-type conductivity, which is formed in a second well of n-type conductivity formed in the p-type semiconductor substrate.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 1 is a circuit diagram showing the circuit design of a voltage conversion circuit according to a first embodiment of the present invention;

FIG. 2 is a waveform diagram for the timing signal generator;

FIG. 3 is a section view showing the physical configuration of the MOS transistors;

FIG. 4 is a section view showing the configuration achieving a high withstand voltage in the MOS transistors in this first embodiment;

FIG. 5 is a section view showing another configuration achieving a high withstand voltage;

FIG. 6 is a section view showing yet another configuration achieving a high withstand voltage;

FIG. 7 is a circuit diagram showing the circuit design of a voltage conversion circuit according to a second embodiment of the present invention;

FIG. 8 is a waveform diagram for the timing signal generator;

FIG. 9 is a section view showing the physical configuration of the MOS transistors;

FIG. 10 is a circuit diagram showing the circuit design of a voltage conversion circuit according to a third embodiment of the present invention;

FIG. 11 is a waveform diagram for the timing signal generator;

FIGS. 12A and 12B show an operationally equivalent circuit;

FIG. 13 is a circuit diagram showing the circuit design of a voltage conversion circuit according to a fourth embodiment of the present invention;

FIG. 14 is a section view showing the physical configuration of the MOS transistors;

FIG. 15 is a circuit diagram showing the circuit design of a voltage conversion circuit according to a fifth embodiment of the present invention;

FIG. 16 is a section view showing the physical configuration of the MOS transistors;

FIG. 17 is a circuit diagram showing the circuit design of a voltage conversion circuit according to a sixth embodiment of the present invention;

FIG. 18 is a waveform diagram for the timing signal generator;

FIGS. 19A and 19B show an operationally equivalent circuit;

FIGS. 20A and 20B are a section view showing the physical configuration of the MOS transistors;

FIG. 21 is a circuit diagram showing the circuit design of a voltage conversion circuit according to a seventh embodiment of the present invention;

FIG. 22 is a section view showing the physical configuration of the MOS transistors;

FIG. 23 is a circuit diagram showing the circuit design of a dc—dc converter used in a voltage conversion circuit according to an eighth embodiment of the present invention;

FIG. 24 is a circuit diagram showing the circuit design of a voltage conversion circuit according to a ninth embodiment of the present invention;

FIG. 25 is a circuit diagram showing the circuit design of a voltage conversion circuit according to a tenth embodiment of the present invention;

FIG. 26 is a circuit diagram showing the internal configuration of the operational amplifier;

FIG. 27 is a circuit diagram showing another internal configuration for the operational amplifier;

FIG. 28 is a circuit diagram showing the circuit configuration of a voltage conversion circuit according to an eleventh embodiment of the present invention;

FIG. 29 is a circuit diagram showing the configuration of a first conventional circuit;

7

FIGS. 30A and 30B show the output waveform of the timing signal generator;

FIG. 31 shows an operationally equivalent circuit;

FIG. 32 is a section view showing the physical configuration of the MOS transistors; and FIG. 33 is a circuit diagram showing the configuration of a second conventional circuit.

DESCRIPTION OF THE PREFERRED EMBODIMENTS

A first embodiment of a voltage conversion circuit according to the present invention is described below with reference to FIG. 1 to FIG. 3.

With reference to FIG. 1, a voltage conversion circuit according to the first embodiment of the present invention has a timing signal generator 25, MOS transistors Q11 to Q16, and capacitors C1 to C4 configured to generate a positive output voltage VOUT1 and a negative output voltage VOUT2 based on dc input voltage Vin. Transistors Q11 to Q16 are switched ON/OFF in accordance with their appropriate timing signals XB2, XA2, XB, A, B3 and A3 from timing signal generator 15.

As further described below, the area enclosed in the dotted line in FIG. 1, that is, timing signal generator 25 and MOS transistors Q11 to Q16, are integrated onto the same p-type semiconductor substrate, and are thus configured as IC chip 20. Capacitors C1 to C4 are discrete components externally connected to IC chip 20.

The timing signal generator 25 generates timing signals XB2, XA2, XB, A, B3, and A3 as shown in FIG. 2 to control the ON/OFF state of their corresponding MOS transistors Q11 to Q16.

MOS transistors Q11 to Q14 are used to convert dc input voltage Vin to positive output voltage VOUT1, and MOS transistors Q11, Q12, Q15, and Q16 are used to convert dc input voltage Vin to negative output voltage VOUT2.

MOS transistors Q11 and Q12 are used for conversion to both positive and negative output voltages in this example, but it will be noted that another pair of MOS transistors could be provided so that MOS transistors Q11 and Q12 are used to convert the input voltage to only one of a positive or negative output voltage.

Yet more specifically, NMOS transistor Q11 and PMOS transistor Q12 are connected between ground line 21 and input line 22 with their respective drain nodes coupled together, as shown in FIG. 1. PMOS transistor Q13 and PMOS transistor Q14 are connected between input line 22 and output line 23, with the drain node of transistor Q14 coupled to the source node of transistor Q13. NMOS transistor Q15 and NMOS transistor Q16 are connected between ground line 21 and output line 24, with the drain node of transistor Q15 coupled to the source node of Q16. The timing signals XB2, XA2, XB, A, B3, and A3 from timing signal generator 25 are applied to the gates of MOS transistors Q11 to Q16. Capacitor C1 is connected to the node between NMOS transistor Q11 and PMOS transistor Q12 and the node between PMOS transistor Q13 and PMOS transistor Q14. Capacitor C2 is connected between input line 22 and output line 23. Capacitor C3 is connected to the node between NMOS transistor Q11 and PMOS transistor Q12 and the node between NMOS transistor Q15 and NMOS transistor Q16. Capacitor C4 is connected between ground line 21 and output line 24.

As noted above, MOS transistors Q11 to Q16 are integrated into the same p-type semiconductor substrate in the voltage conversion circuit according to this first embodiment, and the configuration thereof is described next below.

In FIG. 3 reference numeral 31 is the p-type semiconductor substrate. Two n-type wells 32 and 33 are formed in the p-type semiconductor substrate 31, and two p-type wells 34 and 35 are formed in n-type well 33.

NMOS transistor Q11 having a source S, gate G, and drain D is formed in p-type semiconductor substrate 31. PMOS transistor Q12 having a source S, gate G, and drain D is formed in n-type well 32. NMOS transistors Q15 and Q16 each having a source S, gate G, and drain D are formed respectively in p-type wells 34 and 35. MOS transistors Q13 and Q14 shown in FIG. 1 are configured identically to MOS transistor Q12 shown in FIG. 3, and are therefore not shown in FIG. 3.

Wells 33, 34, 35 are designed with consideration for the withstand voltage and threshold value of the MOS transistors formed in wells 33, 34, and the pass-through voltage and junction voltage between the wells. The following description assumes that the MOS transistor withstand voltage is at least 10 V, and is preferably 20 V to 30 V.

The depth of the wells 33, 34, and 35 is determined with consideration for the MOS transistor withstand voltage and the pass-through voltage between the p-type semiconductor substrate 31 and wells 34/35. In this example the depth of well 33 is 15 μm to 18 μm and the depth of wells 34/35 is 6 μm to 8 μm.

The impurity concentration of wells 33, 34, and 35 is determined according to the threshold value and withstand voltage of the MOS transistors. The surface concentration of impurities in well 33 is, for example, $1\times10^{16}$ to $3\times10^{16}$ atms/cm$^3$, and the surface concentration of impurities in wells 34/35 is $1\times10^{16}$ to $3\times10^{16}$ atms/cm$^3$.

Wells 34 and 35 are shallower than well 33, and are preferably ½ to ⅓ the depth of well 33 considering the MOS transistor withstand voltage and the passthrough voltage between p-type semiconductor substrate 31 and wells 34/35.

It should be noted that the configuration of these wells 33 to 35 also applies to the wells equivalent to wells 33 to 35 formed in the semiconductor substrate in each of the embodiments described below.

The parts of MOS transistors Q15 and Q16 in FIG. 3 are electrically connected as shown in FIG. 1, and the parts of MOS transistors Q11 and Q12 are electrically connected as shown in FIG. 1.

Negative output voltage VOUT2 is applied to p-type well 34 and dc input voltage Vin is applied to n-type well 33 so that the pn junction of p-type well 34 and n-type well 33 is reversed biased during use as shown in FIG. 3.

In addition, ground potential GND is applied to p-type well 35 and dc input voltage Vin is applied to n-type well 33 so that the pn junction of p-type well 35 and n-type well 33 is reverse biased during use.

Furthermore, ground potential GND is applied to p-type semiconductor substrate 31 and dc input voltage Vin is applied to n-type well 33 so that the pn junction of p-type semiconductor substrate 31 and n-type well 33 is reverse biased when used.

Yet further, ground potential GND is applied to p-type semiconductor substrate 31 and dc input voltage Vin is applied to n-type well 32 so that the pn junction of p-type semiconductor substrate 31 and n-type well 32 is reverse biased during use.

Note that the relationship between dc input voltage Vin, ground potential GND, and negative output voltage VOUT2, is Vin>GND>VOUT2.

Potential is applied to each well in the configuration shown in FIG. 3 so that there is a reverse bias between n-type wells, but it is also possible to apply the ground potential GND to n-type well 33 so that n-type well 33 and p-type semiconductor substrate 31 are set to the same potential.

The operation of the first embodiment thus comprised is described next with reference to the figures.

The timing signal generator 25 generates timing signals XB2, XA2, XB, A, B3, and A3 as shown in FIG. 2, supplies the timing signals to the gate of corresponding MOS transistors Q11 to Q16, and thereby controls the ON/OFF state of MOS transistors Q11 to Q16.

As a result of this control, MOS transistors Q11, Q13, Q15 are ON and MOS transistors Q12, Q14, Q16 are OFF in period T1 in FIG. 2, and the equivalent circuit is as shown in FIG. 31A. As shown in FIG. 2, in period T2, MOS transistors Q12, Q14, Q16 are ON and MOS transistors Q11, Q13, Q15 are OFF, and the equivalent circuit is as shown in FIG. 31B.

By repeating the operation of periods T1 and T2, this first embodiment operates as a charge pump type dc—dc converter.

As a result of this operation, positive output voltage VOUT1 and negative output voltage VOUT2 in this first embodiment are as shown in equations (1) and (2) above if the ground potential GND is 0 V.

As described above, MOS transistors Q15 and Q16 used to produce negative output voltage VOUT2 in this first embodiment are n-type, and these NMOS transistors Q15 and Q16 are formed by forming an n-type well 33 inside a p-type semiconductor substrate 31, forming p-type wells 34 and 35 inside the n-type well 33, and then forming the NMOS transistors Q15 and Q16 inside the p-type wells 34 and 35. In addition, the junctions between p-type wells 34 and 35 and the n-type well 33 are reverse biased, the junction between p-type semiconductor substrate 31 and n-type well 33 is reverse biased, and the junctions are used electrically separated. Note that n-type well 33 and p-type semiconductor substrate 31 can have the same potential.

It is therefore possible with this first embodiment to form the timing signal generator 25 and MOS transistors Q11 to Q16 in a p-type semiconductor substrate 31 in a single IC chip, and the conventionally needed level shift circuit and MOS transistors of the prior art can be omitted. The only required external components are capacitors C1 to C4. It is therefore possible to reduce the overall size while maintaining high power conversion efficiency.

Alternate configurations as shown in FIGS. 4 to 6 are preferable as a means of achieving a higher withstand voltage in MOS transistors Q11 to Q16 in this first embodiment. This configuration is described as applied to MOS transistor Q15, as a typical example of transistors Q11–Q16.

FIG. 4 shows an example in which a high withstand voltage is achieved by using a LOCOS offset structure for MOS transistor Q15.

More specifically, in this embodiment, MOS transistor Q15 has a gate insulation layer 37 formed at a specific location on p-type well 34 with gate G formed on this gate insulation layer 37. An offset LOCOS layer 38 is formed around gate insulation layer 37, and an offset impurity layer 39 is formed below this offset LOCOS layer 38 from a low concentration n-type impurity layer. The source S and drain D are formed from a high concentration n-type impurity layer around the outside of this offset LOCOS layer 38.

Also shown in FIG. 4 are element-isolating LOCOS layer 40 for isolating MOS transistor Q15 from other MOS transistors, and a low concentration n-type impurity layer 41 formed below this element-isolating LOCOS layer 40.

This gate insulation layer 37 preferably has a film thickness of 60 nm to 80 nm when a voltage of at least 10 V, or more specifically a voltage of 10 V to 30 V, is applied, although the specific thickness will depend upon the required MOS transistor withstand voltage.

FIG. 5 shows a MOS transistor Q15 in which a high withstand voltage is achieved by using a drain over structure. That is, the bottom side of source S and drain D in this MOS transistor Q15 is surrounded by a low concentration n-type impurity 42 and 42, respectively.

FIG. 6 shows a MOS transistor Q15 in which an even higher withstand voltage is achieved by using both a LOCOS offset structure, as shown in FIG. 4, and a drain over structure, as shown in FIG. 5.

More specifically, the MOS transistor Q15 of FIG. 6 has offset LOCOS layer 38 formed around the gate insulation layer 37, and offset impurity layer 39, which is a low concentration n-type impurity layer, formed below this offset LOCOS layer 38. A low concentration n-type impurity layer 43 is also formed below the element-isolating LOCOS layer 40, source S, and offset impurity layer 39, and a low concentration n-type impurity layer 43 is formed below the element-isolating LOCOS layer 40, drain D, and offset impurity layer 39.

The structures shown in FIG. 4 to FIG. 6 can also be applied to the MOS transistors in the embodiments described below, and a high withstand voltage can be achieved by such applications.

A second embodiment of a voltage conversion circuit according to the present invention is described next with reference to FIG. 7 to FIG. 9.

The voltage conversion circuit according to this second embodiment replaces PMOS transistor Q12 of the first embodiment shown in FIG. 1 with an NMOS transistor Q17 as shown in FIG. 7, and the timing signal generator 25A produces the timing signals shown in FIG. 8 and applies timing signal B2 to the gate of MOS transistor Q17 (see FIG. 8).

The NMOS transistors Q11 and 17 in the voltage conversion circuit according to the second embodiment are configured as shown in FIG. 9.

As shown in FIG. 9 reference numeral 31 identifies a p-type semiconductor substrate, an n-type well 45 is formed in this p-type semiconductor substrate 31, and a p-type well 46 is formed in this n-type well 45. NMOS transistor Q17 having a source S, gate G, and drain D is then formed in p-type well 46. In addition, NMOS transistor Q11 having source S, gate G, and drain D is formed in p-type semiconductor substrate 31.

The drain D voltage of MOS transistor Q11 and the source S voltage of MOS transistor Q17 are applied to p-type well 46, and ground potential GND is applied to n-type well 45 to reverse bias the pn junction of p-type well 46 and n-type well 45.

The internal configuration of other parts of the IC chip 20A of this second embodiment is the same as in IC chip 20 according to the first embodiment, like parts are identified by like reference numerals, and further description is therefore omitted. The operation of this second embodiment is also the same as the operation of the first embodiment, and description thereof is therefore also omitted.

It will thus be apparent that MOS transistors Q11 and Q17 are n-type in this second embodiment, NMOS transistor Q11 is formed in the p-type semiconductor substrate 31 as shown in FIG. 9, and NMOS transistor Q17 is formed inside p-type well 46, which is formed in n-type well 45, which is formed in the p-type semiconductor substrate 31 as shown in FIG. 9. Moreover, the junction between p-type well 46 and n-type well 45 is used reverse biased so that the elements are used electrically separated.

As a result, there is no substrate bias effect on MOS transistor Q17, there is no concern about an increase in the threshold value, and the overall size of this second embodiment can be reduced as compared to the first embodiment.

A voltage conversion circuit according to a third embodiment of the present invention is described next with reference to FIG. 10 to FIG. 12.

The voltage conversion circuit according to this third embodiment has a circuit design as shown in FIG. 10, and based on the dc input voltage Vin outputs a positive output voltage VOUT1 at a voltage level three times dc input voltage Vin and outputs a negative output voltage VOUT2 at a voltage level −2 times the dc input voltage Vin.

As shown in FIG. 10, the voltage conversion circuit of this third embodiment is therefore based on the structure of the first embodiment shown in FIG. 1, adding to this basic circuit MOS transistors Q21 to Q24 and capacitors C5 and C6, and replacing timing signal generator 25 with timing signal generator 25C.

The physical structure of MOS transistors Q11 to Q16 is therefore identical to the MOS transistors Q11 to Q16 of the first embodiment.

To describe the physical structure of MOS transistors Q21 to Q24, MOS transistor Q21 is identical in structure to MOS transistor Q14, and MOS transistor Q22 is identical in structure to MOS transistor Q15. In addition, MOS transistors Q23 and Q24 are identical in structure to MOS transistors Q11 and Q12.

The timing signal generator 25C generates timing signals XB2, XA2, XB, A, XA, B, B3, and A3, applies the timing signals to the gates of MOS transistors Q11 to Q16 and Q21 to Q24 to ON/OFF controls the MOS transistors.

The configuration of other parts of the IC chip 20B of this third embodiment is basically the same as in IC chip 20 according to the first embodiment, like parts are identified by like reference numerals, and further description is therefore omitted.

An example of the operation of this third embodiment is described next with reference to FIG. 10 to FIG. 12.

The timing signal generator 25C generates timing signals XB2, XA2, XB, A, XA, B, B3, and A3 as shown in FIG. 11, applies the timing signals to the gates of corresponding MOS transistors Q11 to Q16 and Q21 to Q24, and thus switches the MOS transistors Q11 to Q16 and Q21 to Q24 ON and OFF.

As a result of this control, MOS transistors Q11, Q13, Q21, Q15, Q24 are ON in period T1 shown in FIG. 11, and MOS transistors Q12, Q14, Q16, Q22, Q23 are OFF. The period T1 equivalent circuit is shown in FIG. 12(A).

As a result, capacitor C1 is charged by dc source voltage Vin in period T1 and the charge of capacitor C5 in the previous period T2 moves to capacitor C2. The positive output voltage VOUT1 at this time is the sum of dc input voltage Vin and both end voltages of capacitor C5.

Also in period T1 capacitor C6 is charged by the voltage sum of the dc source voltage Vin and the stored charge voltage of capacitor C3 from the previous period T2. The negative output voltage VOUT2 at this time is the voltage across capacitor C4.

In period T2 in FIG. 11 MOS transistors Q12, Q14, Q16, Q22, Q23 are ON and MOS transistors Q11, Q13, Q21, Q15, Q24 are OFF. The period T2 equivalent circuit is as shown in FIG. 12(B).

Capacitor C5 is therefore charged in period T2 by the voltage sum of the dc source voltage Vin and the stored charge voltage of capacitor C1 from period T1. The positive output voltage VOUT1 at this time is therefore the sum of dc input voltage Vin and the voltage across capacitor C2.

Also in period T2, capacitor C3 is charged by dc input voltage Vin, and the charge of capacitor C6 stored in period T1 is shared with capacitor C4. The negative output voltage VOUT2 at this time is the voltage of both ends of capacitor C6.

As a result of this operation, the positive output voltage VOUT1 and negative output voltage VOUT2 in this third embodiment are as shown in equations (4) and (5).

$$VOUT1=(3)\cdot Vin \quad (4)$$

$$VOUT2=(-2)\cdot Vin \quad (5)$$

As described above, timing signal generator 25C and MOS transistors Q11 to Q16 and Q21 to Q24 can be integrated to a p-type semiconductor substrate in this third embodiment, thus forming an IC chip, and the only required external parts are capacitors C1 to C6. As a result, the overall size can be reduced.

A voltage conversion circuit according to a fourth embodiment of the present invention is described next with reference to FIG. 13 and FIG. 14.

The voltage conversion circuit according to this fourth embodiment replaces the NMOS transistors Q15 and Q16 of the third embodiment shown in FIG. 10 with PMOS transistors Q25 and Q26 as shown in FIG. 13, and replaces timing signal generator 25C with timing signal generator 25D.

Timing signal generator 25D produces the timing signals similar to the timing signals of generator 25C with the exception that the timing signal B3 that is coupled to transistor Q16 in FIG. 10 is replaced with new timing signal XB3 coupled to transistor Q26 in FIG. 13, and timing signal A3 that is coupled to transistor Q15 in FIG. 10 is replaced with new timing signal XA3 coupled to transistor Q25 in FIG. 13. In other words, timing signals XA3 and XB3 are applied to the gates of PMOS transistors Q25 and Q26 to control their ON/OFF operation. Note that these timing signals XA3 and XB3 are the inverse of timing signals A3 and B3 generated by timing signal generator 25C (see FIG. 11).

The physical structure of the embodiment of FIG. 13 is described next with particular reference to MOS transistors Q25 and Q26, as shown in FIG. 14.

In FIG. 14 reference numeral 31 is a p-type semiconductor substrate. Also, n-type wells 61 to 63 are formed in this p-type semiconductor substrate 31, and p-type well 64 is formed in n-type well 63. An NMOS transistor Q22 with source S, gate G, and drain D is formed in p-type semiconductor substrate 31. PMOS transistors Q25, Q26, Q12 each having a source S, gate G, and drain D are formed in corresponding n-type wells 61, 62, 63. NMOS transistor Q11 with source S, gate G, and drain D is formed in p-type well 64.

This fourth embodiment applies the negative output potential VOUT2 of output line 24 to p-type semiconductor substrate 31, applies ground potential GND of ground line 21 to n-type well 62 and p-type well 64, and applies dc input voltage Vin of input line 22 to n-type well 63. The pn junctions between wells, and the pn junction between well and p-type semiconductor substrate are thus used with a reverse bias.

MOS transistors Q25 and Q26 in this fourth embodiment are p-type transistors formed in n-type wells 61 and 62, as shown in FIG. 14. Furthermore, NMOS transistor Q11 is formed in p-type well 64, as shown in FIG. 14. In addition, the ground potential GND (0 V) of ground line 21 is applied to p-type well 64 and n-type well 62.

It is therefore possible with this fourth embodiment to form a PMOS transistor without causing a reverse bias to a potential below the ground line 21, and the overall size can be reduced as in the third embodiment.

A voltage conversion circuit according to a fifth embodiment of the present invention is described next with reference to FIG. 15 and FIG. 16.

The voltage conversion circuit according to this fifth embodiment has a timing signal generator 25, MOS transistors Q31 to Q36 that have their ON/OFF state controlled by the timing signals from timing signal generator 25, and capacitors C1 to C4 as shown in FIG. 15. Timing signal generator 25 and MOS transistors Q31 to Q36 enclosed in the dotted line in FIG. 15 are integrated to the same n-type semiconductor substrate as further described below, and thus form IC chip 20D.

This fifth embodiment generates a 1x positive output voltage VOUT1 and a −2× negative output voltage VOUT2 based on negative dc input voltage Vin.

The physical structure of MOS transistors Q31 to Q36 is described next with reference to FIG. 16.

In FIG. 16 reference numeral 51 is an n-type semiconductor substrate 51. Two p-type wells 52 and 53 are formed in this n-type semiconductor substrate 51 and two n-type wells 54 and 55 are formed in p-type well 53.

PMOS transistor Q31 with source S, gate G, and drain D is formed in n-type semiconductor substrate 51. NMOS transistor Q32 with source S, gate G, and drain D is formed in p-type well 52. PMOS transistors Q35 and Q36 each having a source S, gate G, and drain D are formed in n-type wells 54 and 55, respectively. NMOS transistors Q33 and Q34 shown in FIG. 15 are constructed identically to MOS transistor Q32 shown in FIG. 16, and are therefore omitted in FIG. 16.

As shown in FIG. 16, specific voltages are applied to reverse bias the well-well pn junction and the well to n-type semiconductor substrate pn junction. Note that the potential of p-type well 53 can be set to GND so that p-type well 53 and n-type semiconductor substrate 51 are the same potential.

With this fifth embodiment of the invention configured as described above, the timing signal generator 25 and MOS transistors Q31 to Q36 can be formed on the n-type semiconductor substrate 51 to create an IC chip, and the only necessary external parts are therefore capacitors C1 to C4. As a result, the overall size can be reduced.

A sixth embodiment of a voltage conversion circuit according to the present invention is described next with reference to FIG. 17 to FIG. 20.

As shown in FIG. 17, the voltage conversion circuit according to this sixth embodiment has a charge pump-type n-fold booster circuit 71 for boosting the dc input voltage VC N-times, timing signal generator 25E, MOS transistors Q41 to Q48 whose ON/OFF state is determined by the timing signals output from timing signal generator 25E, and capacitors CP1, CB0, CB1, CP2, CB2. The structure is configured to output a positive output voltage V3 at output line 75, negative output voltages VDDy at output line 76, and negative output voltage MV3 at output line 77.

In the voltage conversion circuit according to this sixth embodiment, the parts enclosed in the dotted line in FIG. 17, that is, n-fold booster circuit 71, timing signal generator 25E, and MOS transistors Q41 to Q48 are integrated on the same p-type semiconductor substrate, thus forming IC chip 20E. Capacitors CP1, CB0, CB1, CP2, and CB2 are discrete components externally connected to IC chip 20E.

If the n-fold booster circuit 71 has a gain of three times, for example, the n-fold booster circuit 71 comprises the parts of the voltage conversion circuit shown in FIG. 10 for generating a positive voltage.

The timing signal generator 25E generates timing signals XB2, A2, XB1, A1, B3, and A3, and applies these timing signals to switch the MOS transistors Q41 to Q48 ON and OFF.

MOS transistors Q41 to Q44 are used to generate negative output voltage MV3, and MOS transistors Q45 to Q48 are used to generate negative output voltage VDDy.

More specifically, NMOS transistor Q41 and PMOS transistor Q42 are connected between input line 73 and output line 75 with the drain node of NMOS transistor Q41 coupled to the drain node of PMOS transistor Q42, as shown in FIG. 17. NMOS transistor Q43 and NMOS transistor Q44 are connected between input line 73 and output line 77, with the drain node of transistor Q44 coupled to the source node of transistor Q43. Capacitor CP1 has a first end connected to the junction node between NMOS transistor Q41 and PMOS transistor Q42, and a second end connected to the junction node between NMOS transistor Q43 and NMOS transistor Q44. Capacitor CB0 is connected between ground line 72 and output line 75.

NMOS transistor Q45 and PMOS transistor Q46 are connected between ground line 72 and input line 74, with the drain node of PMOS transistor Q46 coupled to the drain node of NMOS transistor Q45. NMOS transistor Q47 and NMOS transistor Q48 are connected between output line 76 and output line 77 with the drain electrode of transistor Q47 coupled to the source electrode of transistor Q48. Capacitor CP2 has a first end connected to the junction node between NMOS transistor Q45 and PMOS transistor Q46, and has a second end connected to the junction node between NMOS transistor Q47 and NMOS transistor Q48. Capacitor CB1 is connected between ground line 72 and output line 77, and capacitor CB2 is connected between output line 76 and output line 77.

As noted above, MOS transistors Q41 to Q48 are integrated onto the same p-type semiconductor substrate in the voltage conversion circuit according to this sixth embodiment, and the configuration thereof is therefore described next below with reference to FIG. 20.

With reference to FIG. 20A, reference numeral 31 is a p-type semiconductor substrate, and n-type wells 72/73 are formed in this p-type semiconductor substrate 31. Two p-type wells 74/75 are formed in n-type well 73.

NMOS transistor Q45 having a source S, gate G, and drain D is formed in p-type semiconductor substrate 31. PMOS transistor Q46 having a source S, gate G, and drain D is formed in n-type well 72. NMOS transistors Q47, Q48 each having a source S, gate G, and drain D are formed in p-type wells 74, 75.

As shown in FIG. 20B, n-type well 73A is formed in p-type semiconductor substrate 31 and p-type well 74A is formed in n-type well 73A. NMOS transistor Q41 having a source S, gate G, and drain D is formed in p-type well 74A.

MOS transistor Q42 shown in FIG. 17 is configured identically to MOS transistor Q46 shown in FIG. 20, and MOS transistors Q43, Q44 shown in FIG. 17 are configured identically to MOS transistors Q47, Q48 shown in FIG. 20, and these are therefore not shown in FIG. 20.

NMOS transistors Q47 and Q48 are equivalent to MOS transistors Q15 and Q16 of FIG. 3, and the conditions for the configuration of wells 33 to 35 can therefore be applied to the configuration of wells 73 to 75.

Negative output voltage MV3 is applied to p-type well 74 and the dc input voltage VDD is applied to n-type well 73 so that the pn junction of p-type well 74 and n-type well 73 is reverse biased as shown in FIG. 20. In addition, negative output voltage VDDy is applied to p-type well 75 and dc input voltage VDD is applied to n-type well 73 so that the pn junction between p-type well 75 and n-type well 73 is reverse biased.

Furthermore, ground potential VSS is applied to p-type semiconductor substrate 31 and dc input voltage VDD is applied to n-type well 73 so that the pn junction between p-type semiconductor substrate 31 and n-type well 73 is reverse biased. Note that n-type well 73 surrounding NMOS transistors Q47 and Q48 can be set to the ground potential. Potential VSS is also applied to p-type semiconductor substrate 31 and dc input voltage VDD is applied to n-type well 72 so that the pn junction between p-type semiconductor substrate 31 and n-type well 72 is reverse biased.

Note that the relationship between dc input voltage VDD, potential VSS, negative output voltage VDDy, and negative output voltage MV3 is VDD>GND>VDDy>MV3.

Operation of the sixth embodiment thus comprised is described next with reference to FIG. 17 to FIG. 19.

Timing signal generator 25E generates timing signals XB2, A2, XB1, A1, B3, and A3 as shown in FIG. 18, and applies these timing signals to the gate of the corresponding MOS transistors Q41 to Q48 to thereby control switching between the ON and OFF states the MOS transistors Q41 to Q48.

By using this sort of control, MOS transistors Q41, Q43, Q45 and Q47 turn ON, and MOS transistors Q42, Q44, Q46 and Q48 turn OFF during an interval T1 shown in FIG. 18. The resulting equivalent circuit during interval T1 is as shown in FIG. 19A.

In contrast, during an interval T2 shown in FIG. 18, the MOS transistors Q42, Q44, Q46 and Q48 turn ON, and the MOS transistors Q41, Q43, Q45 and Q47 turn OFF. The resulting equivalent circuit during interval T2 is as shown in FIG. 19B.

In FIG. 18, it is understood that the states shown in FIGS. 19A and B alternate repeatedly.

As shown in FIG. 17, N voltage multiplier circuit 71 receives inputs Vss and VC, and outputs a positive potential V3 equivalent to N times direct current voltage VC.

First, in a state that corresponds to the interval T2, in other words the state shown in FIG. 19B, capacitor CP1 is coupled across the V3 output from N voltage multiplier 71 and DC voltage VC. Capacitor CP1 therefore receives a charge from the N voltage multiplier 71 and develops a potential difference across equal to V3−VC. Since V3 is (N·VC), the potential across capacitor CP1 can be written as [(N·VC)−VC], which is Vc·(N−1).

Subsequently, in a state that corresponds to the interval T1, in other words the state shown in FIG. 19A, the charge in capacitor CP1 that was charged during the previous interval T2 is shared with capacitor CB1. At this stage, the potential difference across capacitor CP1 is equal to |VC·(N−1)|. Therefore, if ground level VSS serves as the reference, then MV3 has a potential as shown below in equation (7).

Now, from a different perspective, during interval T1, capacitor CP2 is charged by direct current power supply voltage VSS and by the charge that was stored in capacitor CP1 during the previous interval and was moved to the capacitor CP2. At this stage, a voltage having a negative output voltage VDDy as shown below in equation (8) is outputted.

By repeating the above operation, positive output voltage V3, negative output voltage MV3, and negative output voltage VDDy are output as shown by equations (6) to (8) below in this sixth embodiment of the invention.

$$V3 = VC \cdot N \quad (6)$$

$$MV3 = (-1)VC \cdot (N-2) \quad (7)$$

$$VDDy = MV3 + VDD \quad (8)$$

As described above, the only required external components in this sixth embodiment are the capacitors because the n-fold booster circuit 71, timing signal generator 25E, and MOS transistors Q41 to Q48 can be formed in a p-type semiconductor substrate and integrated as an IC chip. As a result, the overall device size can be reduced.

A voltage conversion circuit according to a seventh embodiment of the present invention is described next with reference to FIG. 21 and FIG. 22.

As shown in FIG. 21 the voltage conversion circuit according to this seventh embodiment is based on the sixth embodiment of FIG. 17, but adds a logic circuit 77 consisting of an NMOS transistor Q51 and PMOS transistor Q52, and thus forming IC chip 20F.

FIG. 22 is a section view showing the physical structure of this voltage conversion circuit particularly as concerns the MOS transistors Q51 and Q52 of the output line 77.

Referring to FIG. 22, reference numeral 31 is a p-type semiconductor substrate, n-type wells 72 and 81 are formed in p-type semiconductor substrate 31, p-type well 82 is formed in n-type well 81, and n-type well 83 is formed in p-type well 82. NMOS transistor Q45 having a source S, gate G, and drain D is formed in p-type semiconductor substrate 31. PMOS transistor Q46 having a source S, gate G, and drain D is formed in n-type well 72. NMOS transistor Q51 having a source S, gate G, and drain D is formed in p-type well 82. PMOS transistor Q52 having a source S, gate G, and drain D is formed in n-type well 83.

Other parts of the IC chip 20F according to this seventh embodiment are identical to the IC chip 20E according to the sixth embodiment of FIG. 17, and further description thereof is thus omitted.

As described above this seventh embodiment is based on the sixth embodiment, and therefore achieves the same operational effects as the sixth embodiment.

In addition, because an n-type well 83 is further formed inside p-type well 82, and PMOS transistor Q52 is formed inside this n-type well 83, PMOS transistor Q52 can be used at a lower potential than the potential (VSS=0 V) of the p-type semiconductor substrate 31, and it is therefore possible to provide a CMOS inverter or other logic circuit 77 between two power supplies with a potential lower than the substrate potential.

A voltage conversion circuit according to an eighth embodiment of the present invention is described next with reference to FIG. 23.

The voltage conversion circuit of this eighth embodiment replaces the charge-pump type n-fold booster circuit 71 of the sixth embodiment (see FIG. 17) with a synchronous commutating type switching regulator 86 as shown in FIG.

23. The switching regulator 86 of FIG. 23 along with the timing signal generator 25E and MOS transistors Q41 to Q48 of FIG. 17 may be formed on the same p-type semiconductor substrate, thereby reducing the number of external components and thus reducing the overall size.

As shown in FIG. 23, the switching regulator 86 includes oscillator circuit 87, comparator 88, switching control circuit 89, MOS transistors Q61 and Q62, voltage-dividing resistors RA and RB, coil L1, and capacitor C11. The elements of the part enclosed in the dotted line are formed on a p-type semiconductor substrate, and coil L1 and capacitor C11 are externally connected.

The switching regulator 86 thus comprised controls the switching of the ON/OFF states of MOS transistors Q61 and Q62 by means of switching control circuit 89. First, MOS transistor Q61 is switched ON to store electromagnetic energy in coil L1 by means of the dc supply. Then, MOS transistor Q62 turns ON and the sum of the dc supply voltage and the voltage across coil L1 is taken as output voltage VOUT1.

Output voltage VOUT1 is voltage divided by the voltage-divider circuit consisting of resistors RA, RB to produced a stepped-down voltage representation of VOUT1. Comparator 88 compares the stepped-down voltage with reference voltage Vref1. The switching control circuit 89 adjusts the ON times of MOS transistors Q61 and Q62 according to the output from comparator 88, and thereby holds output voltage VOUT1 constant.

A voltage conversion circuit according to a ninth embodiment of the invention is described next with reference to FIG. 24.

As shown in FIG. 24, the voltage conversion circuit according to this ninth embodiment outputs positive and negative boosted voltages from a single dc source by using a combination of the synchronous commutating switching regulator 86 of FIG. 23 to output a positively boosted voltage and a synchronous commutating switching regulator 90 to output a negatively boosted voltage.

The switching regulator 86 in FIG. 24 is configured identically to the switching regulator 86 shown in FIG. 23, like parts are therefore referenced by like reference numerals, and further description is omitted. As shown in FIG. 24, switching regulator 90 comprises a comparator 91, switching control circuit 92, MOS transistors Q63 and Q64, voltage-dividing resistors RC and RD, coil L2, and capacitor C12. The functionality of switching regulator 90 is similar to that of switching regulator 86 with the exception that the polarity of the power supplies coupled to switching regulator 90 are reversed so that it may provide a negative voltage output.

The elements of the part enclosed in the dotted line in FIG. 24 are formed in a p-type semiconductor substrate in this ninth embodiment using the same method as in the above first and sixth embodiments, thus forming an IC chip to which coils L1 and L2 and capacitors C11 and C12 are externally connected.

With this ninth embodiment of the invention the NMOS transistor Q64 for generating the negative voltage can be formed in the p-type semiconductor substrate, the only external components are the coils L1 and L2 and capacitors C11 and C12, and the overall device size can therefore be reduced.

A voltage conversion circuit according to a tenth embodiment of the present invention is described next with reference to FIG. 25 to FIG. 27.

As shown in FIG. 25, the voltage conversion circuit according to this tenth embodiment comprises a charge pump type dc—dc converter 95 and a plurality of operational amplifiers 96 to 98, forming a dc—dc converter for converting dc input voltage Vin to a specific dc voltage.

The dc—dc converter 95 has a charge pump design and outputs voltages at 0.5, 2, 3, 4, and 5 times the dc input voltage Vin, and these output voltages are supplied as shown in the figure as the supply voltages to the operational amplifiers 96 to 98, which are configured as voltage followers.

Output voltage (VIN·5) of dc—dc converter 95 is voltage divided by voltage-dividing resistors R1 to R3, and these voltage-divided potentials are observed at the output terminals of the operational amplifiers 96 to 98. Note that the internal capacitors of dc—dc converter 95 and any output stabilizing capacitors are not shown in FIG. 25, but are considered to be within the general understanding in the art.

It should be noted that the dc—dc converter 95 could be configured using a plurality of switching regulators, or a combination of charge pump type dc—dc converters and switching regulators.

FIG. 26 shows a first exemplary internal configuration for operational amplifiers 96 to 98. In the present configuration, identified herein as a push mode operational amplifier, the output current flow is modulated by transistor Q79 functioning as a current source.

As shown in FIG. 26, the push mode operational amplifiers 96–98 includes MOS transistors Q71 to Q79, which are formed in a semiconductor substrate in the same way as MOS transistors Q11, Q17, Q13, and Q14 of the second embodiment (see FIGS. 7 and 9) so that there is no substrate bias effect (i.e. no back gate, or back bias, effect) on NMOS transistors Q72 to Q76.

FIG. 27 shows as second exemplary internal configuration for operational amplifiers 96 to 98. In the present configuration, identified herein as a pull mode operational amplifier, the output current is flow modulated by transistor Q89 functioning as a current drain.

As shown in FIG. 27, the pull mode operational amplifiers 96–98 includes MOS transistors Q81 to Q89, which are formed in a semiconductor substrate in the same way as MOS transistors Q11, Q17, Q13, Q14 in the second embodiment so that there is no substrate bias effect (i.e. no back gate, or back bias, effect) on NMOS transistors Q81 and Q87 to Q89. Note that a phase compensation capacitor is omitted in FIG. 26 and FIG. 27.

Various types of amplifiers may be configured as amplifiers 96–98. For example, a class B amplifier, also known as a push-pull amplifier, wherein two active devices alternately drive the output node for alternate half cycles and neither drive the output for a transition region of the operating range between the two cycles, may be use. Alternatively, a class AB amplifier wherein two active devices alternatively drive the output for alternate half cycles throughout the entire operating range, may also be used.

As described above, this tenth embodiment of the invention provides a circuit configuration whereby the NMOS transistors of the operational amplifiers 96 to 98 are free of the substrate bias, or back bias, effect, and operation is therefore normal even if an intermediate potential output from dc—dc converter 95 is applied as the source voltage of the operational amplifiers 96 to 98.

It will also be noted that by applying an intermediate potential from the dc—dc converter 95 as the supply voltage VDD, VSS to the operational amplifiers 96 to 98, power consumption by the operational amplifiers can be suppressed and power conversion efficiency is significantly improved when a negative overcurrent is supplied. For example, when negative overcurrent Io flows from operational amplifier 97 in the direction shown in FIG. 25, a current of five times Io would flow to the input side of a conventional circuit, but is reduced to only three times Io with the design shown in FIG. 25.

A voltage conversion circuit according to an eleventh embodiment of the present invention is described next with reference to FIG. 28.

The voltage conversion circuit according to this eleventh embodiment uses a process whereby the circuit of the seventh embodiment as shown in FIG. 21 is integrated as shown in FIG. 22, for example, and assembles p-channel and channel MOS transistors to a desired potential irrespective of the system supply voltage.

This eleventh embodiment is therefore a dc—dc converter combining a voltage converter 101 comprising a charge-pump type dc—dc converter and switching regulator arrangement with plural operational amplifiers 102 to 104 so as to generate a specific positive and negative voltage based on the dc input voltage Vin.

The voltage converter 101 outputs, for example, a positive voltage that is three or five times the dc input voltage Vin, and negative voltages at −1 and −3 or −5 times the dc input voltage Vin. These output voltages are supplied as the source voltages to the operational amplifiers 102 to 104 configured as voltage followers as shown in FIG. 28. Output voltages from the voltage converter 101 are also voltage divided by voltage dividing resistors R11 to R13, and the voltage-divided voltages are taken from the output terminals of the operational amplifiers 102 to 104.

Advantages of the Invention

As will be known from the preceding description, the MOS transistors used for voltage conversion can be formed in the same p-type semiconductor substrate with the present invention, thereby reducing the externally disposed parts to the capacitors only and making it possible to reduce the overall size while maintaining high power conversion efficiency.

It is also possible according to the present invention to form the MOS transistors used for voltage conversion in the same n-type semiconductor substrate, thereby reducing the externally disposed parts to the capacitors only and making it possible to reduce the overall size while maintaining high power conversion efficiency.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A voltage conversion circuit comprising:
    an input node for receiving an input DC voltage;
    a first output node and a second output node;
    a plurality of MOS transistors;
    a plurality of capacitive devices for storing and transferring charge;
    said plurality of MOS transistors forming a switching network for routing charge among said plurality of capacitive devices to produce a predetermined positive voltage at said first output node and a predetermined negative voltage at said second output node, said switching network including first PMOS transistors and first NMOS transistors for producing said predetermined positive voltage at said first output node, and including at least one second NMOS transistor for producing said negative voltage at said second output node, wherein:
    said first NMOS transistors are formed directly in a p-type active layer of a semiconductor substrate, and said semiconductor substrate further has a first n-well and a second n-well of n-type conductivity in said p-type active layer;
    said first PMOS transistors are formed in said first n-well; and
    said second NMOS transistor is formed in a first p-well of p-type conductivity formed in said second n-well.

2. The voltage conversion circuit of claim 1, further comprising an ON/OFF control means for switching the ON/OFF state of said plurality of MOS transistors, said ON/OFF control means being formed on said p-type active layer.

3. The voltage conversion circuit of claim 1, wherein at least one of said plurality of MOS transistors has:
    a control gate, a source region, and a drain region;
    a LOCOS layer separating said source region and drain region from said control gate; and
    an offset layer of lower impurity concentration than said source and drain regions disposed under said LOCOS layer, said offset layer being of the same conductivity type as said source and drain regions.

4. The voltage conversion circuit of claim 1, wherein said second n-well and said p-type active layer are maintained at substantially the same voltage potential during operation.

5. The voltage conversion circuit of claim 4, wherein said second n-well and said first p-well are maintained in a reversed bias condition during operation.

6. The voltage conversion circuit of claim 1, wherein said second n-well and said p-type active layer are maintained in a reversed bias condition during operation.

7. The voltage conversion circuit of claim 6, wherein said second n-well and said first p-well are maintained in a reversed bias condition during operation.

8. The voltage conversion circuit of claim 1, further having a bias voltage receiving node coupled to said second n-well for maintaining said second n-well at a voltage potential higher than said first p-well and said p-type active layer.

9. A voltage conversion circuit comprising:
    an input node for receiving an input DC voltage;
    a first output node and a second output node;
    a plurality of MOS transistors;
    a plurality of capacitive devices for storing and transferring charge;
    said plurality of MOS transistors forming a switching network for routing charge among said plurality of capacitive devices to produce a predetermined positive voltage at said first output node and a predetermined negative voltage at said second output node, said switching network including first PMOS transistors and first NMOS transistors for producing said predetermined positive voltage at said first output node, and including at least one second NMOS transistor for producing said negative voltage at said second output node; wherein:
    at least one of said first NMOS transistors is formed directly in a p-type active layer of a semiconductor substrate, and said semiconductor substrate further has a first n-well and a second n-well of n-type conductivity in said p-type active layer;

said first PMOS transistors are formed in said first n-well; and at least one of said first NMOS transistors and said second NMOS transistor are formed in a first p-well of p-type conductivity formed in said second n-well.

10. The voltage conversion circuit of claim 9, further comprising an ON/OFF control means for switching the ON/OFF state of said plurality of MOS transistors, said ON/OFF control means being formed on said p-type active layer.

11. The voltage conversion circuit of claim 9, wherein at least one of said plurality of MOS transistors has:
a control gate, a source region, and a drain region;
a LOCOS layer separating said source region and drain region from said control gate; and
an offset layer of lower impurity concentration than said source and drain regions disposed under said LOCOS layer, said offset layer being of the same conductivity type as said source and drain regions.

12. The voltage conversion circuit of claim 9, wherein said second n-well and said p-type active layer are maintained at substantially the same voltage potential during operation.

13. The voltage conversion circuit of claim 12, wherein said second n-well and said first p-well are maintained in a reversed bias condition during operation.

14. The voltage conversion circuit of claim 9, wherein said second n-well and said p-type active layer are maintained in a reversed bias condition during operation.

15. The voltage conversion circuit of claim 14, wherein said second n-well and said first p-well are maintained in a reversed bias condition during operation.

16. The voltage conversion circuit of claim 9, further having a bias voltage receiving node coupled to said second n-well for maintaining said second n-well at a voltage potential higher than said first p-well and said p-type active layer.

17. A voltage conversion circuit comprising:
an input node for receiving an input DC voltage;
a first output node and a second output node;
a plurality of MOS transistors;
a plurality of capacitive devices for storing and transferring charge;
said plurality of MOS transistors forming a switching network for routing charge among said plurality of capacitive devices to produce a predetermined positive voltage at said first output node and a predetermined negative voltage at said second output node, said switching network including first PMOS transistors and first NMOS transistors for producing said predetermined positive voltage at said first output node, and including second PMOS transistors and second NMOS transistors for producing said negative voltage at said second output node; wherein:
the second NMOS transistors are formed directly in a p-type active layer of a semiconductor substrate, and said semiconductor substrate further has a first n-well and a second n-well of n-type conductivity in said p-type active layer;
the first PMOS transistors and the second PMOS transistors are formed in said first n-well; and
the first NMOS transistors are formed in a first p-well of p-type conductivity formed in said second n-well.

18. The voltage conversion circuit of claim 17, further comprising an ON/OFF control means for switching the ON/OFF state of said plurality of MOS transistors, said ON/OFF control means being formed on said p-type active layer.

19. The voltage conversion circuit of claim 17, wherein at least one of said plurality of MOS transistors has:
a control gate, a source region, and a drain region;
a LOCOS layer separating said source region and drain region from said control gate; and
an offset layer of lower impurity concentration than said source and drain regions disposed under said LOCOS layer, said offset layer being of the same conductivity type as said source and drain regions.

20. The voltage conversion circuit of claim 17, wherein said second n-well and said p-type active layer are maintained at substantially the same voltage potential during operation.

21. The voltage conversion circuit of claim 20, wherein said second n-well and said first p-well are maintained in a reversed bias condition during operation.

22. The voltage conversion circuit of claim 17, wherein said second n-well and said p-type active layer are maintained in a reversed bias condition during operation.

23. The voltage conversion circuit of claim 22, wherein said second n-well and said first p-well are maintained in a reversed bias condition during operation.

24. The voltage conversion circuit of claim 17, further having a bias voltage receiving node coupled to said second n-well for maintaining said second n-well at a voltage potential higher than said first p-well and said p-type active layer.

25. A voltage conversion circuit comprising:
an input node for receiving an input DC voltage;
a first output node and a second output node;
a plurality of MOS transistors;
a plurality of capacitive devices for storing and transferring charge;
said plurality of MOS transistors forming a switching network for routing charge among said plurality of capacitive devices to produce a predetermined positive voltage at said first output node and a predetermined negative voltage at said second output node, said switching network including at least one first PMOS transistor for producing said positive voltage at said first output node, and including second PMOS transistors and second NMOS transistors for producing said predetermined negative voltage at said second output node; wherein:
said second PMOS transistors are formed directly in an n-type active layer of a semiconductor substrate, and said semiconductor substrate further has a first p-well and a second p-well of p-type conductivity in said n-type active layer;
said second NMOS transistors are formed in first p-well;
said first PMOS transistor is formed in a first n-well of n-type conductivity formed in said second n-well.

26. A voltage conversion circuit as described in claim 25, further comprising an ON/OFF control means for switching the ON/OFF state of said plurality of MOS transistors, said ON/OFF control means being formed on said n-type active layer.

27. A voltage conversion circuit as described in claim 25, wherein at least one of said plurality of MOS transistors has:
a control gate, a source region, and a drain region;
a LOCOS layer separating said source region and drain region from said control gate; and
an offset layer of lower impurity concentration than said source and drain regions disposed under said LOCOS layer, said offset layer being of the same conductivity type as said source and drain regions.

28. The voltage conversion circuit of claim 25, wherein said second p-well and said n-type active layer are maintained at substantially the same voltage potential during operation.

29. The voltage conversion circuit of claim 28, wherein said second p-well and said first n-well are maintained in a reversed bias condition during operation.

30. The voltage conversion circuit of claim 25, wherein said second p-well and said n-type active layer are maintained in a reversed bias condition during operation.

31. The voltage conversion circuit of claim 30, wherein said second p-well and said first n-well are maintained in a reversed bias condition during operation.

32. The voltage conversion circuit of claim 25, further having a bias voltage receiving node coupled to said second p-well for maintaining said second p-well at a voltage potential higher than said first n-well and said n-type active layer.

33. A voltage conversion circuit comprising:
   an input node for receiving an input DC voltage;
   a first output node and a second output node;
   a booster circuit for boosting said input DC voltage by a factor of n and outputting the boosted voltage as a positive voltage at said first output node;
   a capacitive device;
   a plurality of MOS transistors forming a switching network for transferring charge from said booster circuit to said capacitive device, the resultant voltage across said capacitive device being output as a negative voltage at said second output node, said switching network including PMOS and NMOS transistors used in the generation of the negative voltage across said capacitive device; wherein
      a first group of said NMOS transistors are formed in a p-type active layer of a semiconductor substrate, and said semiconductor substrate further has a first n-well and a second n-well of n-type conductivity in said p-type active layer;
      said PMOS transistors are formed in said first n-well;
      a second group of said NMOS transistors are formed in a first p-well of p-type conductivity formed in said second n-well.

34. A voltage conversion circuit as described in claim 33, further comprising an ON/OFF control means for switching the ON/OFF state of said plurality of MOS transistors, said ON/OFF control means and said booster circuit being formed on said p-type active layer.

35. A voltage conversion circuit as described in claim 33, wherein at least one of said plurality of MOS transistors has:
   a control gate, a source region, and a drain region;
   a LOCOS layer separating said source region and drain region from said control gate; and
   an offset layer of lower impurity concentration than said source and drain regions disposed under said LOCOS layer, said offset layer being of the same conductivity type as said source and drain regions.

36. A voltage conversion circuit as described in claim 33, wherein a third n-well of n-type conductivity is further formed in said first p-well, and a second PMOS transistor not part of said switching network and used in a logic circuit is formed in said third n-well.

37. A voltage conversion circuit as described in claim 33, wherein a third n-well of n-type conductivity is further formed in said first p-well, and a PMOS transistor used for generating said negative voltage is formed inside said third p-well.

38. The voltage conversion circuit of claim 33, wherein said second n-well and said p-type active layer are maintained at substantially the same voltage potential during operation.

39. The voltage conversion circuit of claim 38, wherein said second n-well and said first p-well are maintained in a reversed bias condition during operation.

40. The voltage conversion circuit of claim 33, wherein said second n-well and said p-type active layer are maintained in a reversed bias condition during operation.

41. The voltage conversion circuit of claim 40, wherein said second n-well and said first p-well are maintained in a reversed bias condition during operation.

42. The voltage conversion circuit of claim 33, further having a bias voltage receiving node coupled to said second n-well for maintaining said second n-well at a voltage potential higher than said first p-well and said p-type active layer.

* * * * *